(12) United States Patent
Fischer et al.

(10) Patent No.: US 7,698,357 B2
(45) Date of Patent: Apr. 13, 2010

(54) MODULAR MULTIPLICATION WITH PARALLEL CALCULATION OF THE LOOK-AHEAD PARAMETERS

(75) Inventors: Wieland Fischer, Munich (DE); Holger Sedlak, Sauerlach (DE); Jean-Pierre Seifert, Hillsborough, OR (US)

(73) Assignee: Infineon Technologies AG, Neubiberg (DE)

( * ) Notice: Subject to any disclaimer, the term of this patent is extended or adjusted under 35 U.S.C. 154(b) by 990 days.

(21) Appl. No.: 11/165,834

(22) Filed: Jun. 23, 2005

(65) Prior Publication Data

US 2006/0064453 A1 Mar. 23, 2006

Related U.S. Application Data

(63) Continuation of application No. PCT/EP03/14135, filed on Dec. 12, 2003.

(30) Foreign Application Priority Data

Dec. 23, 2002 (DE) ................................. 102 60 660

(51) Int. Cl.
*G06F 15/00* (2006.01)

(52) U.S. Cl. ...................................................... 708/492

(58) Field of Classification Search ......... 708/491–492, 708/620–632

See application file for complete search history.

(56) References Cited

U.S. PATENT DOCUMENTS

| 4,346,451 A * | 8/1982 | Katayama ................... 708/491 |
| 4,870,681 A * | 9/1989 | Sedlak ....................... 708/710 |
| 5,289,397 A * | 2/1994 | Clark et al. ................. 708/491 |
| 2003/0140077 A1* | 7/2003 | Zaboronski et al. ......... 708/491 |
| 2005/0185791 A1* | 8/2005 | Chen et al. .................. 708/491 |

FOREIGN PATENT DOCUMENTS

| DE | 36 31 992 A1 | 11/1987 |
| DE | 101 07 376 A1 | 8/2002 |
| DE | 101 11 987 A1 | 9/2002 |
| WO | WO-2004/059463 A1 | 7/2004 |

\* cited by examiner

*Primary Examiner*—Chat C Do
(74) *Attorney, Agent, or Firm*—Dickstein, Shapiro, LLP.

(57) ABSTRACT

A device for calculating a multiplication of a multiplier and a multiplicand includes a first performer that performs an exact three operand addition and a second performer that performs an approximated operand addition and a calculator that calculates current look-ahead parameters using the approximated intermediate results. The first performer is further implemented to perform an exact three operand addition in the current iteration step using the exact intermediate result for the current iteration step and using the look-ahead parameters calculated for the current iteration step.

21 Claims, 19 Drawing Sheets

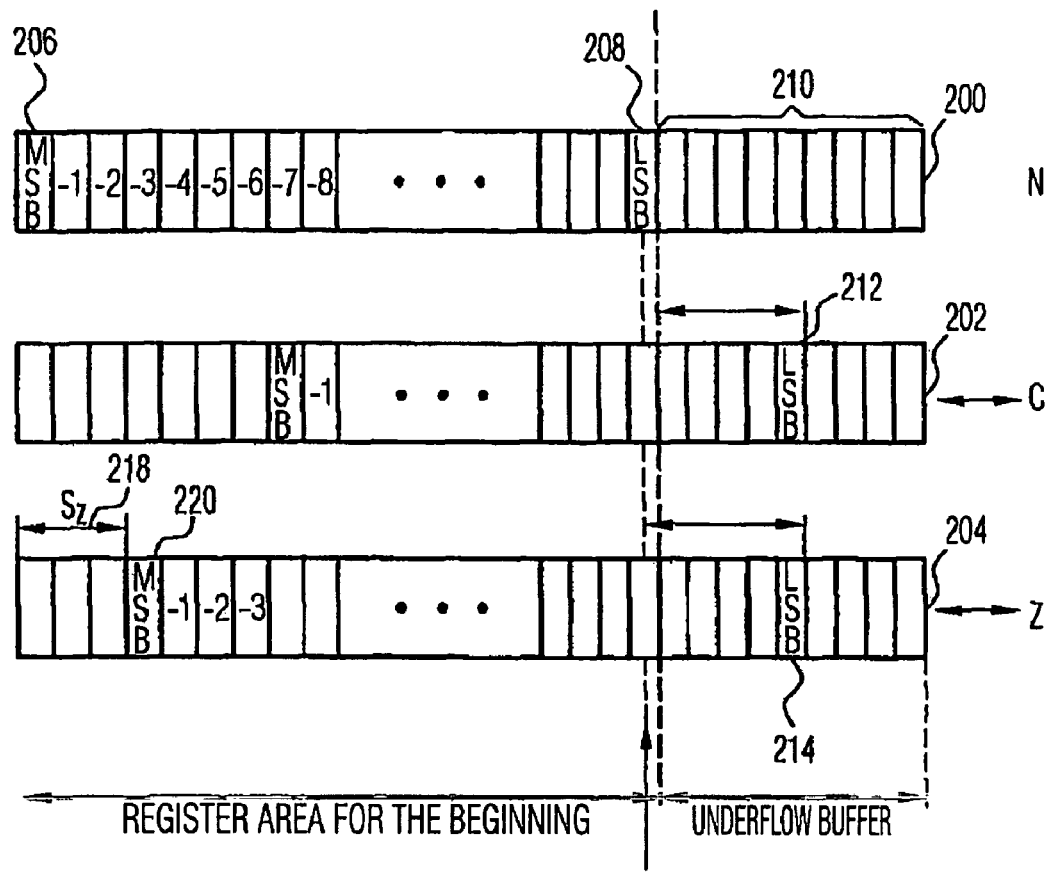
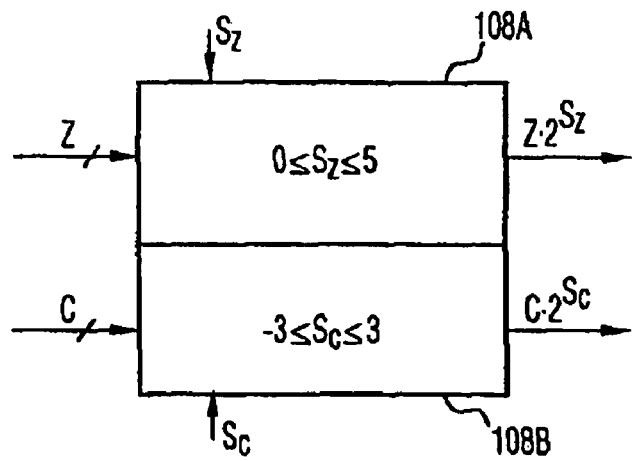

FIG 6 (MODULUS)
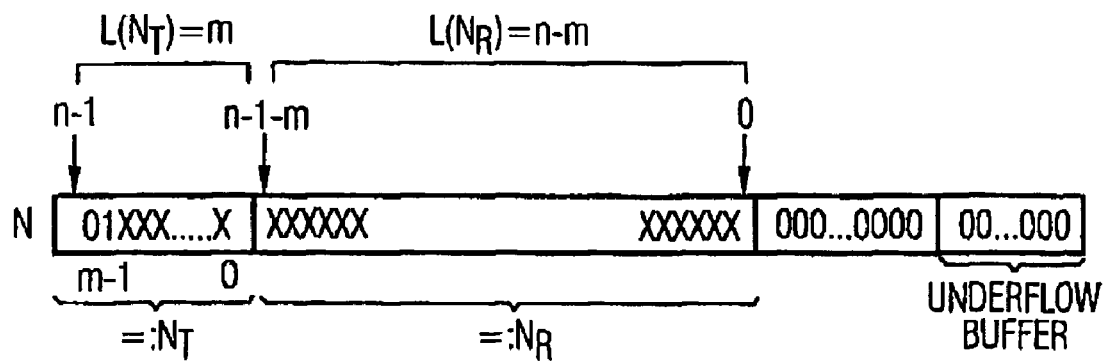
FIG 7 (TRANSFORMED MODULUS)
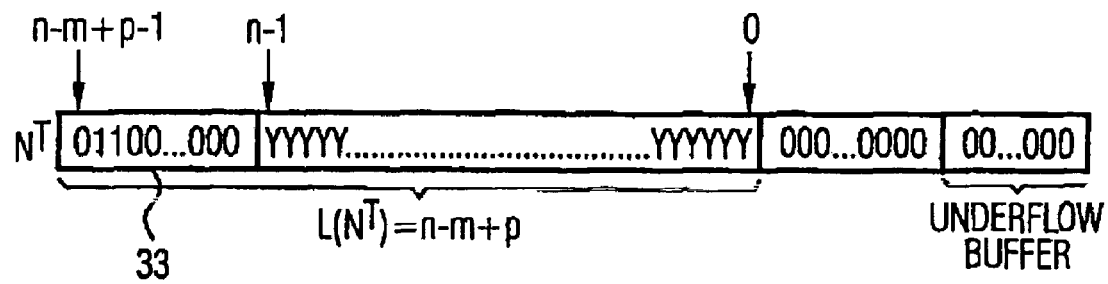
FIG 8 ($\tfrac{2}{3}N^T$)
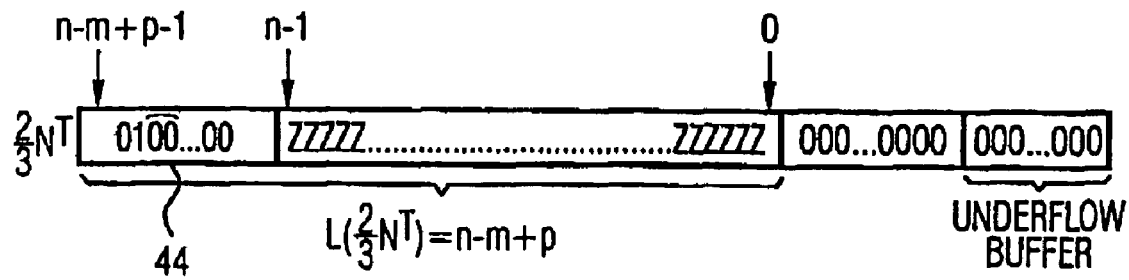

FIG 9 (TRANSFORMED MODULUS WITH RANDOMISATION)
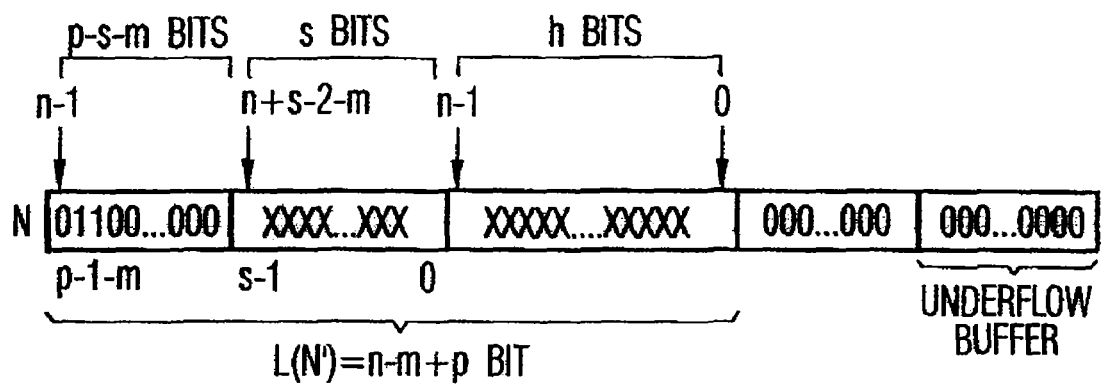
PRIOR ART    FIG 10
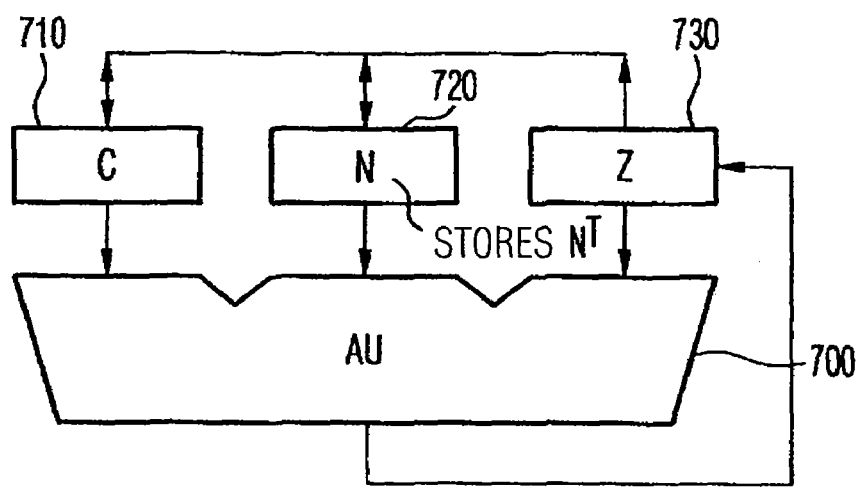

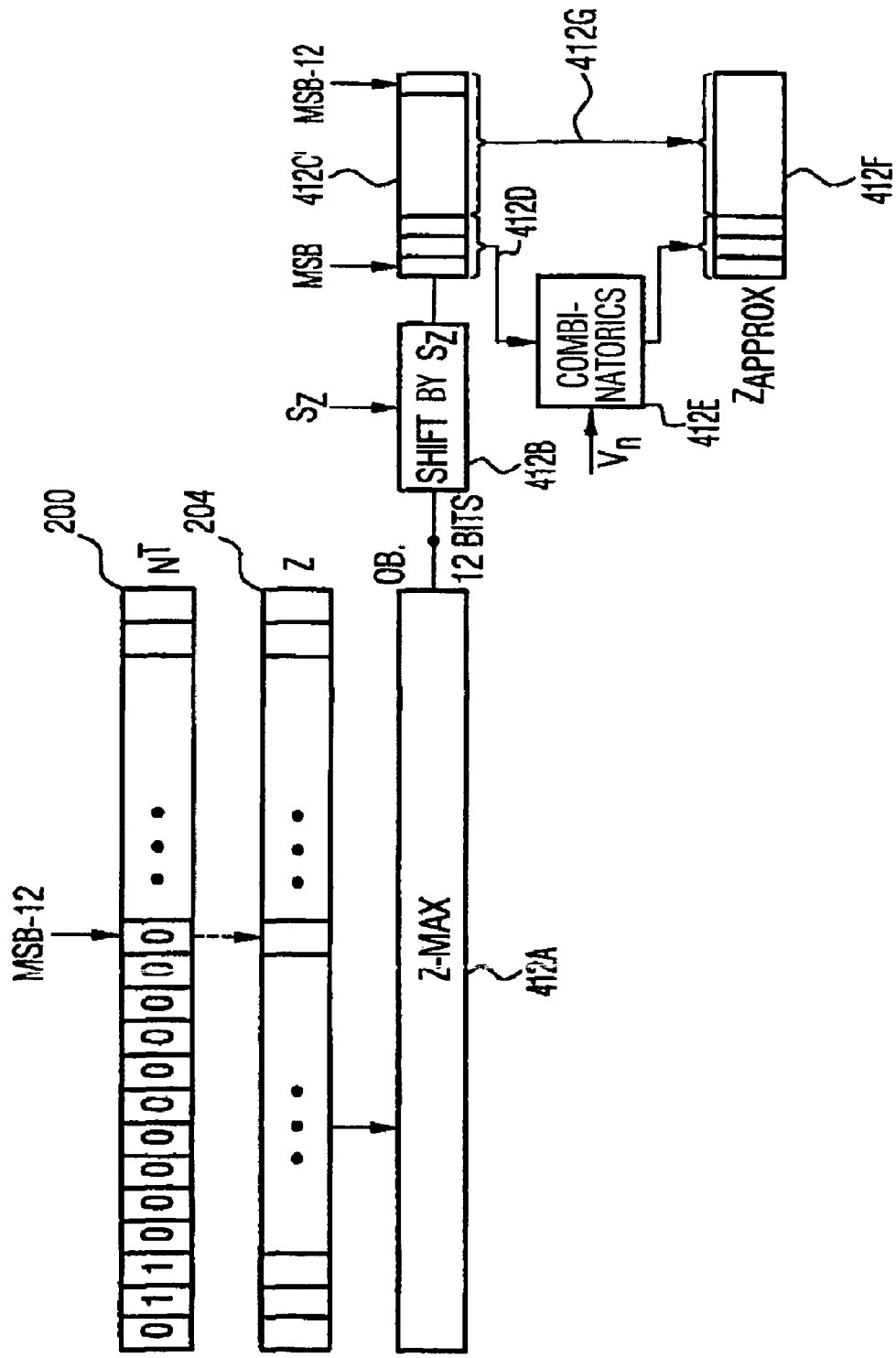

FIG 12

```
var
    Csh                 : integer;
    Zsh                 : integer;
    NoZeros             : integer;
    HaxRegBitLength     : integer;
    NoTopBits           : integer;
    Debug               : integer;

Csh                 := 3;
    Zsh                 := 5;
    NoZeros             := Csh + Zsh;
    HaxRegBitLength     := 160;
    NoTopBits           := NoZeros+4;
    Debug               := 1;
end;
```

FIG 13

```
(*****************************************************)
(*Auxiliary functions*)
(*****************************************************)

function ReturnBit(X, i: integer): integer
begin
        if i >= 0 then
                return ((X div (2**i)) mod 2);
        else
                return 0;
        end;
end;

function SetBit(var X: integer; i, value: integer)
begin
        if (value<0) or (value>1) then
                writeln("Error at SetBit: Value not 1 or 0!")
        end;
        X :=    ( (X div (2**(i+1))) * (2**(i+1)) +
                  value * (2**i) +
                  ( X mod (2**i) )         );
end;

function Bitlength(X: integer): integer
var
        i: integer;
begin
        i := 0;
        while (X>0) do
                X       := X div 2;
                i       := i+1;
        end;
        return i;
end;
```

FIG 14AA

```
(*******************************************************)
(*ZDN – Modular Multiplication*)
(*******************************************************)

function MultMod(C, M, N: integer): integer
external
        (***** Constants *****)
        Csh              : integer ;
        Zsh              : integer ;
        NoZeros          : integer ;
        MaxRegBitLength  : integer ;
        NoTopBits        : integer ;
        Debug            : integer ;
var
        (*****State of the Calculating Unit *****)
        Z        : integer;
        ApproxZ  : integer;
        Lsb      : integer;
        cur_Lsb  : integer;
        LAccu    : integer;
        c        : integer;
        (*****Determination Variables for 3 Operand Addition***** )
        VZ_C     : integer;
        VZ_N     : integer;
        s_Z      : integer;
        s_C      : integer;
        (*****Determination Variables for Multiplication****)
        m        : integer;
        LA       : integer;
        s_M      : integer;
```

FIG 14AB

```
begin
    if C>=N then
        writeln("Error:C>=N");
    end;
    (*****Adjustment*****)
    LAccu := BitLength(M)+l;
    Lsb := MaxRegBitLength - 1 - BitLength(N);
    if Lsb<9 then
        writeln("Error: N too big")
    end;
    N       := N * (2**Lsb);
    C       := C * (2**Lsb);
    (***** Initialisation *****)
    Z       := 0;
    ApproxZ := Z;
    c       := 0;
    VZ_C    := 0;
    VZ_N    := 0;
    s_Z     := 0;
    s_C     := 0;
    s_M     := 0;
    m       := LAccu;
    cur Lsb := Lsb;
    LA      := ReturnBit(M, MaxRegBitLength-1);
```

FIG 14B

```
(*****Modular Multiplication*****)
while ( (m>0) or (c>0) ) do
        LAModulo(ApproxZ, N, c, s_Z, VZ_N);
        Postprocessing_LAModulo(s_Z, VZ_N, c, m);

LAMultiplication(M, m, cur_Lsb, s_Z, s_M, LA, VZ_C);
        Postprocessing_LAMultiplication(s_M, s_C, s_Z, VZ_N);

Shift(C, s_C);

ApproxZ := (Z div(2**(MaxRegBitLength-1-NoTopBits)))*(2**(MaxRegBitLength-1-NoTopBits)
        ThreeOperandAddition(Z, s_Z, VZ_C, C, VZ_N, N);

m       := m - s_M;
        c       := c - s_C;
        cur_Lsb := cur_Lsb + s_C;
end;

if (ReturnBit(Z, MaxRegBitLength-1)=1) then
        ThreeOperandAddition(Z, 0, 0, 0, 1, N);
end;

Z    := Z div (2**Lsb);
return Z;
end;
```

FIG 15

(***ThreeOperandAddition**)

function ThreeOperandAddition(var Z: integer; s_Z. VZ_C. C. VZ_N. N: integer)
external
     MaxRegBitlength    : integer;
begin
     Z := ( Z * (2**s_Z) + VZ_C * C + VZ_N * N ) mod (2**MaxRegBitLength);
end;

function Shift(var X: integer; s_X: integer)
begin
     if (s_x>=0) then
          X    := X*(2**s_X);
     else
          X    := X div (2**(-s_X));
     end;
end;

FIG 16A (***LA Modulo***)

function LAModulo(Z, N , c : integer; var s_Z, VZ_N : integer)
external
    MaxRegBitLength    : integer;
    Zsh              : integer;
    NoTopBits      : integer;
var
    VZ     : integer;
    cur_Zsh : integer;
    i      : integer;
begin
    cur_Zsh := min(Zsh. c);
    (***Approximative 3-Op-Add***)
    N     := (N div (2**NoTopBits)) * (2**NoTopBits);
    Z     := ThreeOperandAddition(Z, s_Z, 0, 0, VZ_N, N);

(*** 0-1-Searcher ***)
    VZ    := ReturnBit(Z, MaxRegBitLength-1);
    s_Z   := 0;
    VZ_N  := 2*VZ - 1;
    while ( (VZ=ReturnBit(Z, MaxRegBitLength-2-s_Z)) and (s_Z<cur_Zsh) ) do
        s_Z    := s_Z+1;
    end;

if (VZ=ReturnBit(Z, MaxRegBitLength-2-s_Z)) then
        s_Z := cur_Zsh;
        VZ_N := 0;
    end;
end;

FIG 16B

```
function Postprocessing_LAModulo(var s_Z, VZ_N : integer; c, m : integer)
external
        NoZeros         : integer;
begin
        if ( (c< =NoZeros) and (m>0) and (s_Z>0) ) then
                s_Z     : = 0;
                VZ_N    : = 0;
        end;
end;
```

FIG 17A (***LA Multiplication***)

```
function LAMultiplication(M, m, cur_Lsb, s_Z: integer; var s_M, LA, VZ_C : integer)
external
        Csh : integer;
var
        cur_Csh : integer;
begin
        cur_Csh := min(cur_Lsb, Csh);
        s_M    := 0;
(*****0-1-Searcher*****)
        while ( (LA=ReturnBit(M,m-1)) and (s_M< (cur_Csh+s_Z)) and (m >0) ) do
                s_M    := s_M + 1;
                m      := m - 1;
        end;

if    ( (LA=ReturnBit(M,m-1)) ) then
                VZ_C   := 0;
    elsif ( not(LA=ReturnBit(M,m-1)) and not(LA=ReturnBit(M,m-2)) ) then
                VZ_C   := 1 - 2*LA;
                LA     := 1 - LA;
    elsif ( not(LA=ReturnBit(M,m-1)) and (LA=ReturnBit(M,m-2)) ) then
            if (s_M=cur_Csh+s_Z) then
                VZ_C   := 0;
            else
                VZ_C   := 1 - 2*LA;
                s_M    := s_H + 1;
            end;
        end;
end;
```

FIG 17B

```
function Postprocessing_LAMultiplication(s_M : integer; var s_C, s_Z, VZ_N : integer)
external
        Csh     : integer;
begin
        s_C     := s_Z - s_M;

if (s_C>Csh) then
                s_C     := Csh;
                s_Z     := s_C + s_M
                VZ_N    := 0;
        end;
end;
```

MODULAR MULTIPLICATION WITH PARALLEL CALCULATION OF THE LOOK-AHEAD PARAMETERS

CROSS-REFERENCE TO RELATED APPLICATION

This application is a continuation of copending International Application No. PCT/EP03/14135, filed Dec. 12, 2003, which designated the United States and was not published in English.

BACKGROUND OF THE INVENTION

1. Field of the Invention

The present invention relates to cryptography and in particular to concepts for calculating a multiplication of a multiplier and a multiplicand with regard to a modulus within a cryptographical calculation, wherein the multiplier, the multiplicand and the modulus are parameters of the cryptographical calculation.

2. Description of the Related Art

Cryptography is one of the basic applications for modular arithmetic. One basic algorithm for cryptography is the known RSA algorithm. The RSA algorithm builds up on a modular exponentiation which may be illustrated as follows:

$$C = M^d \mod (N).$$

Here, C is an encrypted message, M is a non-encrypted messaged, d is the secret key and M is the modulus. The modulus N is usually generated by a multiplication of two prime numbers p and q. The modular exponentiation is broken up into multiplications using the known square and multiply algorithm. For this, the exponent d is broken up into powers to two, so that the modular exponentiation may be broken up into several modular multiplications. In order to be able to implement the modular exponentiation in an efficient way regarding calculation, the modular exponentiation is therefore broken up into modular multiplications which may then be broken up into modular additions.

DE 3631992 C2 discloses a cryptography method wherein the modular multiplication may be accelerated using a multiplication look-ahead method and using a reduction look-ahead method. The method described in DE 3631992 C2 is also referred to as the ZDN method and is described in more detail with reference to FIG. 18. After a starting step 900 of the algorithm the global variables M, C and N are initialized. The aim is to calculate the following modular multiplication:

$$Z = M*C \mod N.$$

M is referred to as the multiplier, while C is referred to as the multiplicand. Z is the result of the modular multiplication, while N is the modulus.

Hereupon different local variables are initialized which need not be explained in more detail here. In the following, two look-ahead methods are applied. In the multiplication look-ahead method GEN_MULT_LA using different look-ahead rules a multiplication shift value $s_Z$ and a multiplication look-ahead parameter a are calculated (910). Hereupon, the current content of the Z register is subjected to a left-shift operation by $s_z$ digits (920).

Substantially, in parallel to that a reduction look-ahead method GEN_Mod_LA (930) is performed to calculate a reduction shift value $S_N$ and a reduction parameter b. In a step 940 the current content of the modulus register, that is N, is shifted to the left or to the right, respectively, by $s_n$ digits in order to generate a shifted modulus value N'. The central three operand operation of the ZDN method takes place in a step 950. Hereby, the intermediate result Z' is added to the multiplicand C after step 920 which is multiplied with the multiplication look-ahead parameter a and to the shifted modulus N' which is multiplied with the reduction look-ahead parameter b. Depending on the current situation the look-ahead parameters a and b may have a value of +1, 0 or −1.

One typical case is that the multiplication look-ahead parameter a is +1 and that the reduction look-ahead parameter is −1 so that to a shifted intermediate result Z' the multiplicand C is added and the shifted modulus N' is subtracted from the same. a will have a value equal 0 when the multiplication look-ahead method would allow more than one preset number of individual left shifts, that is when $s_z$ is greater than the maximum admissible value of $s_z$, which is also referred to as k. For the case that a equals 0 and that Z' is rather small due to the preceding modular reduction, that is the preceding subtraction of the shifted modulus, and is in particular smaller than the shifted modulus N', no reduction need to take place, so that the parameter b is equal 0.

The steps 910 to 950 are performed until any digits of the multiplicand are processed, that is until m is equal 0, and until also a parameter n is equal 0 which indicates whether the shifted modulus N' is even greater than the original modulus N, or whether despite the fact that already any digits of the multiplicand have been processed still further reduction steps need to be performed by subtracting the modulus from Z.

Finally it is determined whether Z is smaller than 0. If this is the case, the modulus N needs to be added to Z in order to achieve a final reduction, so that finally the correct result Z of the modular multiplication is obtained. In a step 960 the modular multiplication is ended using the ZDN method.

The multiplication shift value sZ and the multiplication parameter a which are calculated in step 910 by the multiplication look-ahead algorithm result from the topology of the multiplier and from the used look-ahead rules which are described in DE 3631992 C2.

The reduction shift value SN and the reduction parameter b are determined by a comparison of the current content of the Z register to a value ⅔ times N, as it is also described in DE 3631992 C2. Due to this comparison the name of a ZDN method results (ZDN=Zwei Drittel N=two thirds of N).

The ZDN method, as it is illustrated in FIG. 18, leads the modular multiplication to back a three operand addition (block 950 in FIG. 18), wherein for an increase of the calculation time efficiency the multiplication look-ahead method and along with it the reduction look-ahead method are used. Compared to the Montgomery reduction a calculation time advantage may be achieved.

In the following, with reference to FIG. 19 the reduction look-ahead method is explained in more detail which is implemented in block 930 of FIG. 18. First of all, in a block 1000 a reservation for the local variables is performed, i.e. the reduction look-ahead parameter b and the reduction shift value $s_n$. In a block 1010 the reduction shift value $s_n$ is initialized to 0. Hereupon the value ZDN is calculated in a block 1020 which is equal to ⅔ of the modulus N. This value, which is determined in block 1020 is saved in a separate register on the crypto-coprocessor, the ZDN register.

In a block 1030 it is then determined whether the variable n is equal to 0 or whether the shift value SN is equal to −k. k is a value which defines the maximum shift value which is given by hardware. In the first run block 1030 is answered by NO, so that in a block 1030 the parameter n is decremented and that in a block 1060 also the reduction shift value is decremented by 1. Then, in block 1080 the variable ZDN is allocated again, that is with half its value, which may easily be achieved by a right shift of the value in the ZDN register. In block 1100 it is then determined whether the absolute value of the current intermediate result is greater than the value in the ZDN register.

This comparison operation in block 1100 is the central operation of the reduction look-ahead method. If the question is answered by YES, the iteration is ended and the reduction look-ahead parameter b is allocated, as it is illustrated in block 1120. If the question to be answered in block 1100 is answered by NO, however, an iterative step back is performed in order to examine the current values of n and $s_n$ in block 1030. If block 1030 is answered by YES sometime in the iteration, a step back to block 1140 is performed in which the reduction parameter b is set to zero. In the three operand operation illustrated in block 950 in FIG. 18 this leads to the fact that no modulus is added or subtracted, which means, that the intermediate result Z was so small that no modular reduction was required. In block 1160 the variable n is then newly allocated, wherein then finally in block 1180 the reduction shift value $s_n$ is calculated which is required in block 940 of FIG. 18 to perform the left shift of the modulus in order to obtain a shifted modulus.

In blocks 1200, 1220 and 1240 finally the current values of n and k are examined regarding further variables MAX and cur_k in order to examine the current allocation of the N register in order to guarantee that no register exceedings takes place. The further details are not important for the present invention, are, however, described in more detail in DE 3631992 C2.

The algorithm illustrated in FIGS. 18 and 19 may be implemented in hardware, as it is illustrated in FIG. 10. For the three operand operation to be performed in block 950 an arithmetical unit 700 is required which is referred to as AU in FIG. 10. The same is coupled to a register C 710 for the multiplicand, to a register N 720 for the modulus and to a register Z 730 for the current intermediate result of the modular multiplication. Form FIG. 10 it may further be seen that the result of the three operand operation is fed into the Z register 730 again via a feedback arrow 740. From FIG. 10 further the connection of the registers to each other may be seen. The value ZDN calculated in block 1020 of FIG. 19 needs to be saved in a separate ZDN register 750. The ZDN comparison or the iteration loop illustrated in FIG. 19, respectively, is further controlled in its operation by a separate control logic 760 for the ZDN comparison.

The main task of the ZDN algorithm for the calculation of Z:=M×C mod N further consists of the following two operations:

1. Calculation of the shift values $s_z$ and $s_i$ for the registers Z and N, so that the following equation is satisfied:

$$\tfrac{2}{3}N \times 2^{-si} < |Z| \leq \tfrac{4}{3}N \times 2^{-si} \text{ and}$$

2. Calculation of the three operand sum:

$$Z := 2^{sz}Z + aC + b \times 2^{sz-si}N,$$

The multiplication look-ahead parameter a and the reduction look-ahead parameter b may take values of −1, 0 and +1, as it is known.

It is to be noted that the intermediate result Z, the multiplicand C and the modulus N are long numbers, i.e. numbers whose number of digits or bits, respectively, may be greater than 512, wherein these numbers may have up to 2048 digits.

The above-described known method for performing the modular multiplication therefore comprises the following slightly rewritten three operand addition:

$$N := N * 2^{sn}$$

$$Z := Z * 2^{sz} + v_c * C + v_n * N.$$

In the preceding equations $s_z$ indicates the shift value of the intermediate result Z as it is calculated from the known Booth method, i.e. the multiplication look-ahead method. $s_n$ indicates the shift value of N as it is calculated and as it was performed above.

In one practical implementation the shift values $s_z$ and $s_n$ must not be infinitely high, because for this shifters for shifting long numbers are provided which can only carry out a bit shift in a long number register up to a maximum shift value. Therefore, in a cryptography processor which operates according to the known ZDN method, a shift value $s_z$ between 0 and 5 is enabled. With regard to the shifting of the modulus a shift value between −3 and +3 is used.

It is a disadvantage of the limited shift values that e.g. the shift value $s_z$ for shifting the intermediate result Z from a preceding iteration step is often too small for a current iteration step. This is the case when the multiplication look-ahead algorithm determines that the multiplier is implemented so that e.g. a greater shift value than 5 is possible. This is the case when depending on the look-ahead rule e.g. more than 5 successive zeros occur in the multiplier. If it is considered that the multiplier M comprises 1024 or even 2048 bits then this situation may easily occur frequently. Due to the limited shift value the known ZDN method will in this "special case" react by performing a three operand operation, with the maximum shift value, that, however, the multiplication look-ahead parameter $v_c$ is set to 0, i.e. that in this step nothing is added to the multiplicand. In the next iteration step a new multiplication shift value $s_z$ is calculated which is then, when it is greater than the maximum shift value $s_{zmax}$, limited by a maximum shift value, which again leads to a degenerated "three operand operation", in which the multiplicand is again not added, in which therefore only the shifted intermediate result and the shifted modulus are added under consideration of the sign of the modulus.

From the preceding consideration it may be seen that in such as special case, when the multiplication look-ahead algorithm would allow a great shift, the same may not be implemented to achieve maximum efficiency due to the limited shift amount $s_{zmax}$.

The known ZDN method is therefore not able to use the full efficiency increase of the multiplication look-ahead method. In order to achieve an efficiency increase, in the known ZDN method a shifter increase would have to be preformed which, however, leads to the fact that more chip area is required, in particular with integrated circuits for chip-cards, which is not always tolerable due to restricted area provisions by chip-card manufacturers or may lead to considerable price increases, respectively.

It is to be noted here, that in particular in the field of cryptography processors a largely competitive market exists where already small price differences may lead to the survival of one supplier while the other supplier will not survive. The reason for this is that processors for chip-cards are a mass product as chip-cards are typically manufactured in great numbers.

On the other hand there are considerable security requirements for the chip-card processors, as chip-cards are typically in the hand of users, i.e. also in the hands of attackers, which have the chip-card processor to be attacked completely in their hands. Therefore security requirements for cryptography algorithms continuously increase, which for example becomes obvious through the fact that for increasing the security of the RSA algorithm the operands are no more only e.g. 1024 bit long but have to be 2048 bit long.

Anyway, the overall area required by the processor is firmly given by the chip-card manufacturer. This means that a manufacturer for chip-card processors must place arithmetic units and place-intensive memories on a firmly given area. On the other hand, increasingly compact cryptography algorithms also require more working memory, so that an enlargement of an arithmetic unit, so that e.g. a greater shifter is built in, is often not tolerable for this reason. If more chip area was given to the arithmetic unit, i.e. for example to a shifter, then on the other hand less working memory could be implemented on the firmly given chip area, which again leads to the fact that certain highly-complicated cryptography algorithms can not be implemented at all or are slower in calculating as if they were processed and implemented by rival products, respectively.

The known ZDN method explained with reference to FIGS. 18 and 19 is disadvantageous in so far that the three operand addition of the long-number calculating unit illustrated by block 950 in FIG. 18 may not continuously be processed but that always first a calculation of a look-ahead parameter $s_z'$ $s_n$ and if necessary of the parameters a and b is to be carried out using blocks 910 and 930 before then the three operand addition may be performed. It is so to speak a serial two stage principle in an iteration loop, in so far that first look-ahead parameters are calculated and then the three operand addition is performed. During the calculation of the shift and sign parameters $s_z$ and $s_n$ or a and b, respectively, the calculating unit for performing the three operand addition runs idle, which is illustrated by block 950 in FIG. 18.

SUMMARY OF THE INVENTION

It is an object of the present invention to provide a more efficient concept for calculating a multiplication of a multiplier and a multiplicand with reference to a modulus.

In accordance with a first aspect, the present invention provides a device for calculating a multiplication of a multiplier and a multiplicand with regard to a modulus using an iteration method comprising several iteration steps, including a preceding iteration step, a current iteration step and an iteration step following the current iteration step, having: means adapted for performing an exact three operand addition in the preceding iteration step using a preceding intermediate result, the modulus and the multiplicand and using preceding look-ahead parameters to obtain an exact intermediate result for the current iteration step; means adapted for performing an approximated operand addition in the preceding iteration step using the preceding intermediate result and the modulus and at least one part of the preceding look-ahead parameters in order to obtain an approximated intermediate result for the current iteration step; and means adapted for calculating current look-ahead parameters in the preceding iteration step using the approximated intermediate result and the multiplier, wherein means for performing the exact three operand addition is implemented to perform an exact three operand addition in the current iteration step using the exact intermediate result for the current iteration step, the modulus, the multiplicand and the current look-ahead parameter calculated by the means for calculating, and wherein means for performing the approximated operand addition is implemented to perform an approximated operand addition in the current iteration step using the current intermediate result and the modulus and at least part of the current look-ahead parameters to obtain an approximated intermediate result for the iteration step following the current iteration step; wherein means for calculating is implemented to obtain look-ahead parameters in the current iteration step for the iteration step following the current iteration step using the approximated intermediate result for the iteration step following the current iteration step and the multiplier; and a controller implemented to feed means for performing the exact three operand addition and for performing the approximated operand addition in the preceding iteration step and in the current iteration step so that the two means can operate in parallel.

In accordance with a second aspect, the present invention provides a method for calculating a multiplication of a multiplier and of a multiplicand with regard to a modulus using an iteration method having several iteration steps including a preceding iteration step, a current iteration step and an iteration step following the current iteration step within a cryptographic calculation, wherein the multiplier, the multiplicand and the modulus are parameters of the cryptographic calculation, having the steps of: in the preceding iteration step: performing an exact three operand addition using a preceding intermediate result, the modulus and the multiplicand and using preceding look-ahead parameters in order to obtain an exact intermediate result of the cryptographic calculation for the current iteration step; performing an approximated operand addition using the preceding intermediate result and the modulus and at least one part of the preceding look-ahead parameters in order to obtain an approximated intermediate result of the cryptographic calculation for the current iteration step; and calculating current look-ahead parameters using the approximated intermediate result of the cryptographic calculation and the multiplier, in the current iteration step: performing an exact three operand addition using the exact intermediate result of the cryptographic calculation for the current iteration step, the modulus, the multiplicand and the current look-ahead parameters; performing an approximated operand addition using the current intermediate result and the modulus and at least part of the current look-ahead parameters to obtain an approximated intermediate result of the cryptographic calculation for the iteration step following the current iteration step; and calculating look-ahead parameters for the iteration step following the current iteration step using the approximated intermediate result of the cryptographic calculation for the iteration step following the current iteration step and the multiplier.

In accordance with a third aspect, the present invention provides a computer program comprising a program code for performing the above mentioned method, when the program is running on a computer.

BRIEF DESCRIPTION OF THE DRAWINGS

These and other objects and features of the present invention will become clear from the following description taken in conjunction with the accompanying drawings, in which:

FIG. 2 shows a register setting of the registers N, C and Z with a left-justified modulus orientation;

FIG. 3 shows a detailed illustration of the two shifters with limited shift values;

FIG. 6 shows a division of the modulus N into a first section $N_T$ of bits and into a second section $N_R$ of bits;

FIG. 7 shows the separation of the transformed modulus $N^T$ into a first section of digits with the length N ($N^T$) and the remaining digits;

FIG. 8 shows an illustration of the digits of a ⅔-fold of the transformed modulus $N^T$;

FIG. 9 shows a schematic illustration of the digits of the transformed modulus including randomization;

FIG. 10 shows a schematic illustration of a calculating unit for performing the modular multiplication using a modulus transformation;

FIG. 11 shows a schematic illustration of an implementation of means for performing the approximated operand addition;

FIG. 12 is a variable definition of a computer program according to the present invention;

FIG. 13 is an illustration of an auxiliary functions for the inventive method;

FIGS. 14aa and 14ab show initialization information for a method according to a preferred embodiment;

FIG. 14b shows a program-type illustration of an embodiment of the inventive method including multiplicand shifting and parallel calculation of the look-ahead parameters in the current iteration step for the next iteration step;

FIG. 15 shows a detailed program illustration of the three operand addition used in FIG. 14b;

FIG. 16a shows a detailed illustration of the function look-ahead modulus used in FIG. 14b;

FIG. 16b shows a detailed illustration of the function post processing_look-ahead modulus used in FIG. 14b;

FIG. 17a shows a detailed illustration of the function look-ahead multiplication of FIG. 14b;

FIG. 17b shows a detailed illustration of the function post processing_look-ahead multiplication;

DESCRIPTION OF THE PREFERRED EMBODIMENTS

Figure 1:
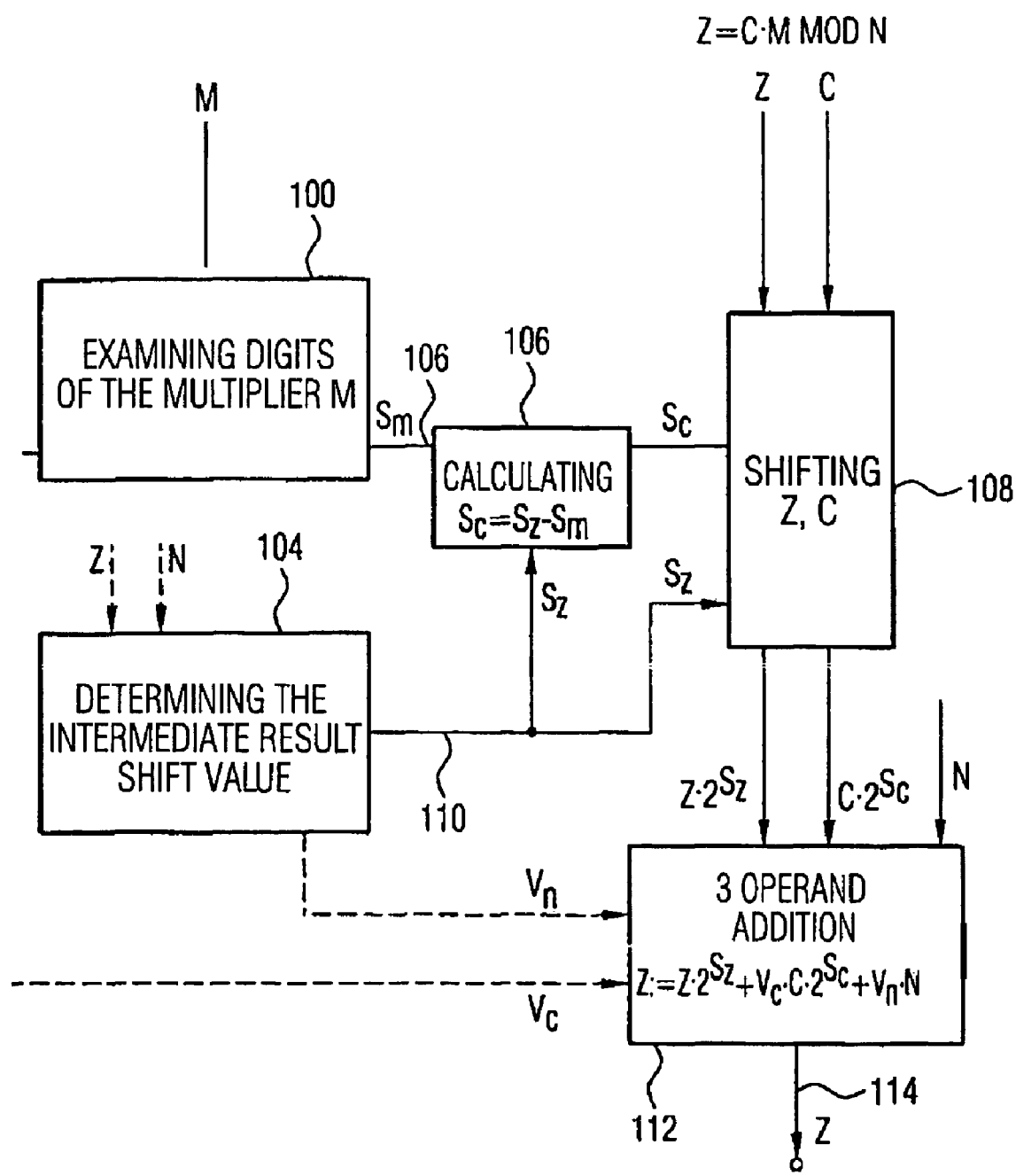
FIG. 1 shows a block diagram of an inventive device for calculating a multiplication with a shift of the multiplicand.

The present invention is based on the findings that the calculation of the look-ahead parameters and the performing of the three operandi addition is parallelized in so far that in a current iteration step during the exact calculation of the three operand addition an approximated three operand addition is performed to estimate the exact result and to calculate the look-ahead parameters for the next iteration step using the estimated results. Thus, in the next iteration step the look-ahead parameters calculated in the current iteration step may be used to perform an exact calculation of the intermediate result for the second-next iteration step, etc.

The inventive device for calculating a multiplication therefore includes means for performing an exact three operand addition, means for performing an approximated operand addition in order to obtain an approximated intermediate result and means for calculating look-ahead parameters for the next iteration step using the approximated intermediate result, wherein means are implemented such that in parallel to the exact calculation of the three operand addition an approximated calculation and a calculation of the look-ahead parameters for the next step is performed.

In an especially preferred embodiment of the present invention the accelerated calculation of the look-ahead parameters is combined with a new iteration method in which the modulus remains fixed and the multiplicand is shifted with regard to the modulus. This modification of the known ZDN method illustrated in FIG. 18 has the advantage that a better use of resources with regard to present shifters is enabled for converting the shift values into real register shifts.

In a further preferred embodiment of the present invention instead of the modulus given by a modular exponentiation, a transformed modulus derived from this modulus is used, which is selected such that some upper bits are known and are always the same independent of a currently used modulus. In this case means for performing an approximated operand addition may be implemented in an especially simple way in order to obtain an approximated intermediate result.

According to the invention, thus a good and very fast estimation of the currently running three operand addition is achieved. Using this prematurely present approximated result then in the remaining time in which another exact three operand addition is performed, the look-ahead parameters are calculated. These are provided when the next three operand addition begins. By this an acceleration of the method by the factor of 2 is achieved.

In preferred embodiments of the present invention for a fast approximation it is assumed that the future shift and sign values basically only depend on the top e.g. 12 bits of Z, whereas $s_c$ only depends on the multiplier.

Apart from that it is assumed that the top bits of Z are basically not dependent on the multiplicand C. This is the case because in the described iterative methods for a modular multiplication the reduction always somewhat lags behind the multiplication. Finally, in the embodiment including the modulus transformation, use is made of the fact that the top bits of N are known. Means for performing an approximated operand addition is thus implemented to perform the following calculation $Z[L-1, L-12] := Z[L-1, L-12] * 2^{sz} + V_n * N[L-1, L-12]$.

$Z[L-1, L-12]$ indicates the top 12 bits of Z. Using this approximated $Z[L-1, L-12]$, the shift and sign values may be calculated exactly almost any time. In almost all other cases only sub-optimum shift and sign values are present. The result is always correct, however.

FIG. 1 shows a block diagram of the inventive device for calculating a multiplication of a multiplier N and a multiplicand C with regard to a modulus N using an iteration method with several iteration steps. It is to be noted that the multiplier, the multiplicand and the modulus may be integer values or polynomials.

Figure 18:
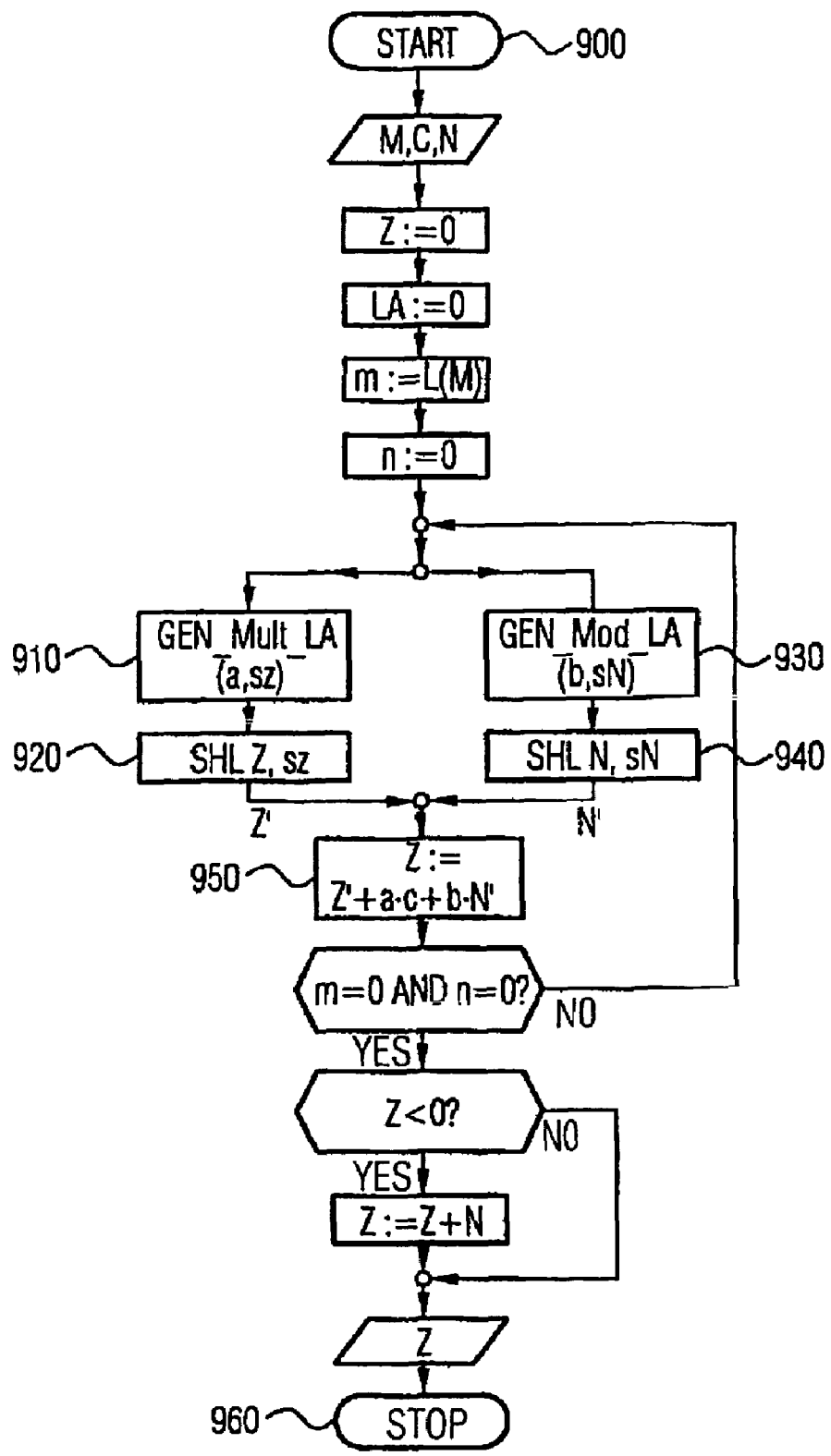
FIG. 18 shows a flow chart illustration of the known ZDN method.

As it was explained with regard to FIG. 18, multiplication concepts are iterative concepts, in particular in cryptographical calculations, such that a multiplication is calculated using several principally identically running iteration steps. FIG. 1 shows the means or sub-steps, respectively, which may be affected during the performance of an iteration step.

In particular, FIG. 1 includes means 100 for examining digits of the multiplier M for a current iteration step using a multiplication look-ahead algorithm in order to obtain a multiplication look-ahead shift value $s_m$ at an output 102 of means 100.

In a preferred embodiment of the present invention, the multiplication look-ahead algorithm is a known Booth algorithm, which when it implements several look-ahead rules also generates a multiplication look-ahead parameter $v_c$ apart from a multiplication look-ahead shift value $s_n$. The explicit calculation of a look-ahead parameter is not required, however, when the multiplication look-ahead algorithm only uses one or a limited number of look-ahead rules, such that—provided sufficiently great shifters are present—the sign parameter $v_c$ is always equal to "1". For other look-ahead rules, however, the case may also occur that the sign parameter $v_c$ is equal to "1". If a multiplication look-ahead shift value $s_n$ was obtained, which is too great, the case may also occur that the multiplication look-ahead parameter $v_c$ is equal to 0.

The device shown in FIG. 1 further includes means 104 for determining the intermediate result shift value $s_z$ which is in principle implemented so that it determines an intermediate result shift value greater than 0, wherein the intermediate result shift value causes that an intermediate result to be processed, when it has been shifted by the intermediate result shift value $s_z$, has a most significant bit (MSB) whose order is closer to an order of the most significant bit of the modulus than a most significant bit of the intermediate result of the preceding iteration step. In other words this means that the intermediate result shift value $s_z$ causes the intermediate result to be shifted by at least one digit to the left when more significant bits are arranged left in a register and less significant bits right.

At this point it is further to be noted that a most significant bit (MSB) is a bit in a register which carries useful information. If, for example, a number is smaller than the register length would admit, and if the number within the register is right-justified, then the number will have a most significant bit which is placed somewhere within the register. Above the MSB of this number possibly zeros are placed within the register which, however, do not carry significant information. Therefore, below the most significant bit the bit of a number is located which has the highest order compared to the other bits of the number and simultaneously carries useful information.

In a special embodiment means 104 for determining the intermediate result shift value $s_z$ is implemented to shift the intermediate result as far as possible to the left, such that the MSB of the shifted intermediate result has the same order as the MSB of the modulus. In this case a modulus subtraction, i.e. a reduction, will lead to a substantially smaller new intermediate result after a three operand addition. Thus the case is aimed, at as in this case the reduction is always good, fast and efficient. Means 104 for determining the intermediate result shift value is, however, already effective when it produces an intermediate result shift value $s_z$ greater than zero.

The inventive device further includes means 106 for calculating a multiplicand shift value $s_c$ which is equal to the difference between the intermediate result shift value $s_z$ and the multiplication look-ahead shift value $s_m$. From the equation in block 106 of FIG. 1 it may be seen that already an intermediate result shift value greater than 0 causes that the multiplication shift value $s_m$ does not fully strike through and determine the shifter dimensioning, but that the multiplication look-ahead shift value $s_m$ is already reduced regarding its amount in the case of a value $s_z$ greater than 0.

The device shown in FIG. 1 further includes means 108 for shifting the intermediate result Z by the intermediate result shift value $s_z$ which is provided by means 104 via an output 110 and by means 106 and also by means 108. Means for shifting is further implemented to shift the multiplicand C by the multiplicand shift value $s_c$ in order to obtain a shifted multiplicand.

The device shown in FIG. 1 additionally includes means 112 for performing a three operand addition using the shifted intermediate result, the shifted multiplicand and the modulus which is fixed in order to obtain an intermediate result for the current iteration step which is output at an output 114 of the three operand adding means 112.

At this point it is noted that the shifting means 108 and the three operand adding means 112 may not necessarily be implemented as separate means but that the shifting of an operand, i.e. the multiplication of the operand by $2^s$, must not necessarily be implemented in hardware, i.e. need not be carried out by an actual register shifting, but may in principle be achieved also in software by a multiplication by $2^s$. In this case means 108 and 112 are combined into one single means which performs the functionality of the multiplication and the subsequent addition according to the equation set out in block 112 in FIG. 1.

FIG. 2 shows a schematic illustration of the three relevant registers, i.e. the modulus register N 200, the multiplicand register C 202 and the intermediate result register Z 204.

During a shift of the multiplicand in the multiplicand register 202 the modulus N is firmly entered in the modulus register 200. Apart from that it is preferred to enter the modulus N into the modulus register 200 in a left-justified way, so that a most significant bit is entered into the most significant register position which is indicated at the far left in FIG. 2 and is designated by 206. In the adjacent register cells the bits MSB-1, MSB-2, MSB-3 etc. of the modulus N follow, up to a least significant bit (LSB) 208 of the modulus. The modulus N which is either the normal modulus which is for example used in an RSA calculation, or which is preferably a transformed modulus, as it is explained in the following, is always fixed in the modulus register 200 during the whole iterative calculation. In contrast, the multiplicand C and the intermediate result Z are variable in their registers 202, 204 when using the shifting means or the corresponding shifter, respectively, as it is indicated by the double arrow next to the registers. FIG. 2 shows a typical situation in any iteration step during the calculation of a multiplication of a multiplier N and the multiplicand C with regard to the modulus N. It may be seen from FIG. 2 that the multiplicand C has already been shifted 5 bits to the right, i.e. into the underflow buffer 210. It may further be seen that the intermediate result register is currently set such that the current intermediate result could be shifted upwards by 3 bits.

In the embodiment shown in FIG. 2 the modulus N is always arranged left-justified in the modulus register 200. Depending on the bit length of the modulus 100 the LSB 208 of the modulus N comes to life somewhere in the modulus register. The bits 210 below the LSB 208 of the modulus N in the modulus register then define the underflow buffer in which the multiplicand C may move.

In the following, the concept of shifting the multiplicand C is compared to the known ZDN algorithm in which the multiplicand C was constant. While in the old ZDN method analogous to the step-wise multiplication of two binary numbers processing is performed in principle according to school mathematics in which the intermediate result is shifted to the left by the multiplication look-ahead shift value and the modulus was then also shifted upwards in order to achieve an efficient reduction in every iteration step, in the inventive method the comma is so to speak moved with regard to its location within the register. This is performed by shifting the multiplicand C which so to speak defines the comma.

In one preferred embodiment that uses multiplicand shifting, the value Z is always shifted as high as possible in the intermediate results register 204 so that a reduction takes place. In the case shown in FIG. 2, for the next iteration step a shifting value $s_z$ 218 (3 bits) would be chosen, so that the MSB 220 of the current Z value within the Z register 204 then becomes equal in its order to the MSB 206 of the modulus. If then the modulus N is subtracted from the register Z, the difference will be relatively small because the numbers are approximately the same. At this point it is noted that the calculation may be performed both with positive and with negative numbers.

In a next step an examination of digits of the multiplier M is performed for the current iteration step, as it was illustrated in FIG. 1, in order to find out which multiplication look-ahead shifting value $s_m$ is admitted. From FIG. 1, block 106 it may be seen that subsequently the shifting value $s_c$ for the multiplicand register 202 is determined from $s_z-s_m$.

If, for example, the multiplication look-ahead algorithm determines that the multiplication shifting value $s_m$ is 3, i.e. equals $s_z$ 218, then a multiplicand shifting value $s_c$ equal to 0 is calculated. When this result is compared to the known ZDN algorithm, it showns that in this case $s_z$ was selected as it is allowed by the Booth algorithm. Therefore, no comma shifting, i.e. no shifting of the multiplicand C, must take place.

In the following, the case is considered in which $s_m$ is smaller than $s_z$, i.e. is only 2 in the example shown in FIG. 2, while $s_z$ 218 is 3. Compared to the known Booth algorithm this means that the intermediate result was actually shifted one bit too far upwards. Z is therefore too high by the factor 2 for the addition to C, i.e. one shift by one register digit. In order to compensate that, according to the new method the multiplicand C is also shifted upwards by one bit now. In other words this means, that the comma which is defined by C or the LSB 212 of C, respectively, is adjusted to the selected Z shifting value $s_z$ 218. After a shift of C upwards by one bit or by the value of $s_c$, respectively, the ratios between C and Z are clear again and an error-free addition may take place in block 112 of FIG. 1.

Additionally, due to the fact that $s_z$ was chosen as high as possible, an efficient reduction will also take place in the three operand addition in block 112 of FIG. 1, as Z is about in the order of magnitude of N, which is already achieved by a shift by $s_z$ 218, and as even one more multiplicand C was added so that the numbers N and Z are in any case in a similar order of magnitude.

In the following, the case is considered in which $s_m$ is greater than $s_z$. As it was explained it is preferred to select $s_z$ 218 maximal. A greater value of $s_z$ than three bits in FIG. 2 is not possible because then the MSB 220 of Z would "fall out" of the register 204.

If the Booth algorithm now determines $s_m$ to be greater than $s_z$ then in the iteration method described in FIG. 2 the intermediate result value was for example shifted upwards by a one bit too few. This means, that for the three operand additions Z is too small compared to C without any remedial measures. In order to counteract this situation, therefore also the multiplicand C is for example shifted to the right by one bit according to the difference between sZ and $s_m$, so that the ratios between C and Z are correct again. Also in this case again a good reduction takes place because Z lies in the order of magnitude of N due to the fact that it was shifted upwards maximally, so that the difference between Z and N is again a relatively small number, i.e. that a good reduction within the three operand addition took place in block 112 of FIG. 1.

The concept illustrated in FIG. 2 therefore has two essential advantages with regard to the use of existing shifter resources. One such shifter for shifting Z and C, as it may be implemented in the shifting means 108 of FIG. 1 is shown in FIG. 3. The shifter schematically includes one first shifter part 108a for shifting Z and a second shifter part 108b for shifting C. The first shifter part 108a is a shifter which can only shift into the positive direction. It is used for shifting Z. From this it may be seen, that the LSB 214 of Z may never be shifted into the underflow buffer 210. FIG. 2, however, shows the case after a three operand addition, which is why the LSB 212 of C and the LSB 214 of Z have the same significance, because by the three operand addition the LSB 214 is determined by the LSB of any participant operands in block 212 of FIG. 1, independent of the fact by how much Z was shifted upwards before this three operand addition. After N is fixed and C may be shifted downwards, C still determines the LSB of Z after a three operand addition. If Z would now be shifted to the left by $s_z$ 218, as it was described, the LSBs 212 and 214 of C and Z would diverge before the three operand addition in order to then coincide again after the three operand addition. As $s_m$ is always positive because the multiplier is not suddenly processed into the opposite direction, i.e. from the less significant to a higher significant bit, and because $s_z$ is always positive, the amount of $s_c$ is always smaller than $s_z$, so that the LSB of Z is always determined by C.

The great shifter 108a, which may shift by +5, is therefore used for $s_z$ so that by this great shift value Z a shift to N as close as possible is always performed. At this point it is to be noted, that the case shown in FIG. 2 is not necessarily the typical case. It may also be the case that Z and N were almost the same in a preceding three operand addition, so that the MSB 220 still has a smaller significance than the MSB 206 of the modulus N despite a maximum shift to the left. In order to make this case as rare as possible, the great shifter which may only shift in one direction, i.e. the shifter 108a, is used for shifting Z. Because the multiplicand C needs to be shifted in both directions, for this multiplicand a shifting possibility upwards, i.e. to the left, and a shifting possibility down, i.e. to the right, is required. Because $s_c$ will always be a difference of positive numbers, the shifter needs not be implemented so great. It therefore turned out, that a shifter with a shifter possibility of −3 to +3 is sufficient. Present shifter capacities are therefore used more efficiently by the new concept with a variable multiplicand C, because the multiplication shift value $s_m$ never has to be directly converted into a shift (this value is usually high), and because the great shifter may thus be used for reduction purposes, i.e. for shifting Z as close as possible to N, so that a good reduction takes place.

It has turned out that in an iterative embodiment of the old ZDN method and also the new method with a variable multiplicand C the reduction always somewhat "lags behind" compared to the multiplication.

In the old ZDN method this has come obvious by the fact that after processing all digits of the multiplier M the modulus N shifted in the old method was still greater than the original modulus. In other words, in the old ZDN method part of the current modulus was still present in the overflow buffer. Therefore, some few residual operand additions had to be preformed, in which no multiplier digits had still to be examined, however, in which, however, so many three operand additions with a shifted modulus (with a modulus shifted to the right) still had to be performed until the MSB of the modulus had moved out of the overflow buffer again and was positioned at the same place within the register which it set at the beginning of the calculation, i.e. before the first iteration step. The multiplication look-ahead algorithm was therefore typically already "done" some steps ahead of the reduction look-ahead algorithm.

In the new method this situation also occurs. It is, however, not noticed by the fact that the modulus is present in the overflow buffer. In the new method the modulus is yes, as it was implemented, fixed and non-shiftable. When all multiplier digits have been processed and when it is determined that the LSB 212 is still smaller than the LSB 208 of the modulus, then also still some further final operand additions have to be performed without the consideration of multiplier digits because those have already been processed. Because the multiplier digits have already been processed, also the multiplicand C is not needed any more. When all multiplier digits have been processed the same need not be shifted onto the "null line" again, which is defined by the LSB 208. As soon as all multiplier digits have been processed the multiplicand C is not interesting any more. When all multiplier digits have been processed, the LSB 212 of the multiplicand C therefore does not have to be shifted upwards again using the small shifter 108b, which would only allow a shift value of 3 to the left in one step. Instead, the multiplicand is not interesting as soon as all multiplier digits have been processed and is not needed any more.

For the final reduction it is interesting, however, where the LSB 214 of the intermediate result register Z was located in the underflow buffer 210. This way, the LSB 212 of the multiplicand C determined the order of the LSB 214 of the intermediate result register Z during the last three operand addition, in which only multiplier digits were present. A final reduction will take place, however, until the LSB 214 is located on the "null line" defined by the LSB 208 of the modulus register 200. This "upshifting" of the Z value in the intermediate result register 204 is now, however, performed using the great shifter 108a, which always allows five shift values in the embodiment shown in FIG. 3. The final reduction is therefore performed in great steps, while it had to be performed using the small shifter in the known method, as it was required there that the modulus N be driven back to its original position. In the new method the modulus N is fixed, however, while the comma is managed by the multiplicand C which is, however, not interesting for the final reduction because there are no more multiplier digits left. Therefore, the multiplication look-ahead parameter $v_c$ is equal to 0 anyway, so that for shifting up Z in the "degenerated" final operand addition always the great shifter Z may be used which allows a shift of up to 5.

In conclusion the exemplary shifting means shown in FIG. 3 provides a virtual Booth shifter of the length of 8 (!) and a reduction shifter of the length of 5 with a 5 shifter for Z and a −3, . . . , +3 shifter for C.

With regard to a detailed description of the new iterative multiplication concept reference is later made to FIG. 12 to 17b below, which illustrate a preferred embodiment of the present invention in a pseudo-code explained in parallel, wherein in this illustrated embodiment the new method including a shift of the multiplicand C is combined with the concept of modulus transformation and a new method for a parallel calculation of the multiplication look-ahead parameters and the reduction look-ahead parameters.

Figure 4:
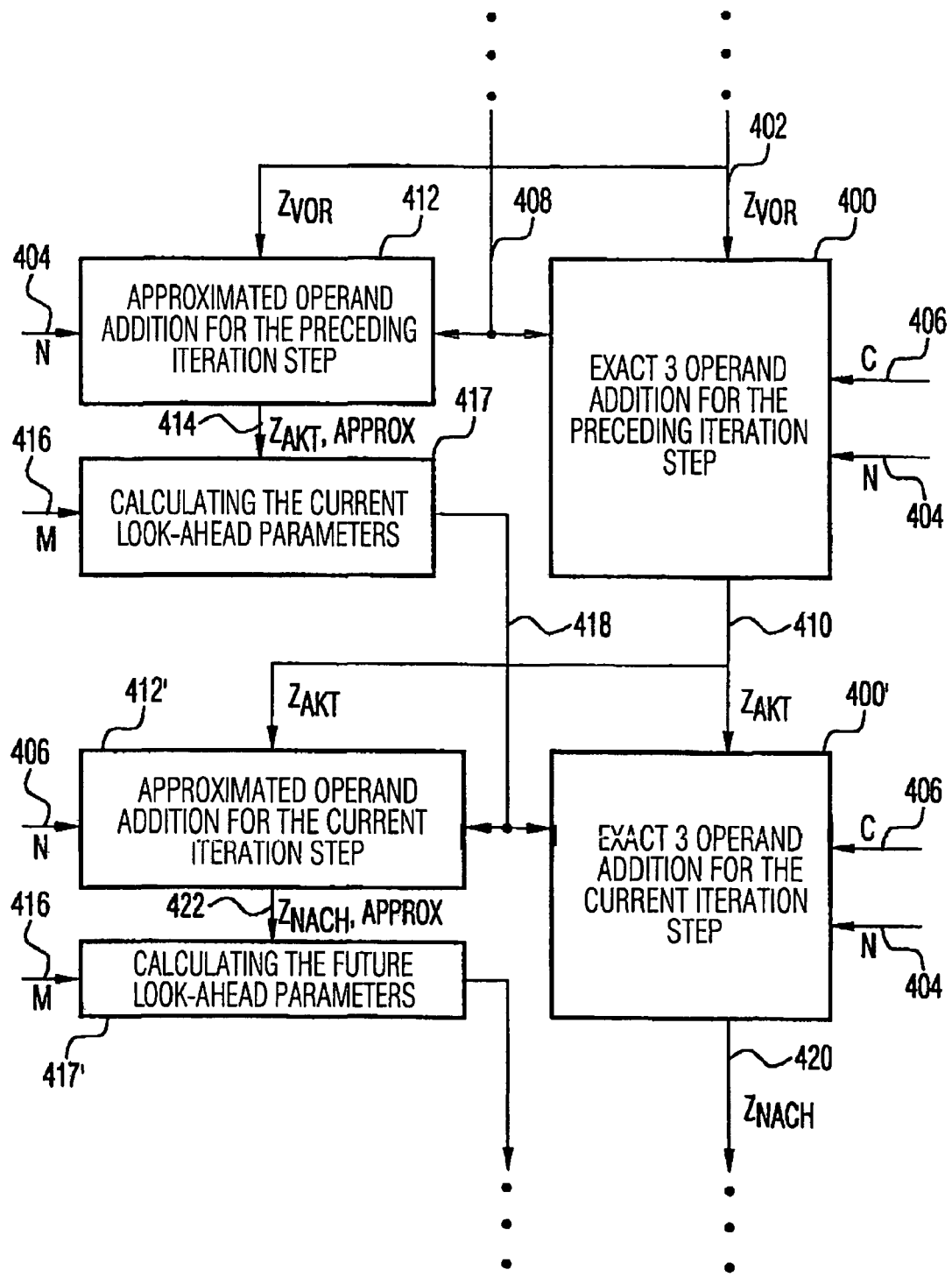
FIG. 4 shows a block diagram of the accelerated three operand addition with a parallel calculation of the look-ahead parameters for the next iteration step.

FIG. 4 shows a block diagram of a device for calculating a multiplication of a multiplicand and a multiplier with regard to a modulus using an iteration method with several iteration steps including a preceding iteration step and a current iteration step. The device shown in FIG. 4 may also be used to accelerate the calculation of the look-ahead parameters $s_m$, $s_c$ and $s_z$ of the new method described in FIG. 1 with shiftable multiplicand C and may also be used to calculate the look-ahead parameters $s_z$ and $s_n$ of blocks 920 and 940 of FIG. 18, i.e. the look-ahead parameters of the known ZDN method.

At this point it is noted that depending on the situation look-ahead parameters are on the one hand the shift values and are, however, on the other hand, also the signs for the multiplicand and the modulus which are determined depending on the look-ahead rule and on the situation of the shift values with regard to the available shifters and the size of the available underflow buffer and may be +, − or 0, as it is explained below.

The device shown in FIG. 4 for an accelerated performance of the iteration method includes means 400 for performing an exact three operand addition for the preceding iteration step using a preceding intermediate result $Z_{vor}$ 402 ($Z_{vor}$=preceding intermediate result), the modulus N 404, the multiplicand Z 406 and the preceding look-ahead parameters which are provided in the schematic illustration of FIG. 4 via a line 408. Means 400 for calculating the exact three operand addition provides an exact intermediate result for the current iteration step $Z_{akt}$ ($Z_{akt}$=intermediate result for the current iteration step), which is designated by 410 in FIG. 4. The device shown in FIG. 4 further includes means 412 for performing an approximated operand addition for the preceding iteration step using the preceding intermediate result $Z_{vor}$ and the modulus N 404 and using at least part of the preceding look-ahead parameters, provided by line 408 in FIG. 4, in order to obtain an approximated intermediate result for the current iteration step which is designated by $Z_{akt,\ approx}$ in FIG. 4. Using the approximated intermediate result 414 for the current iteration step which, however, does not correspond to the exact intermediate result $Z_{akt}$ 410, illustrates, however, an estimation or prediction of the same, respectively, and using the multiplier M 416 the current look-ahead parameters are calculated and output via line 418. Means 417 for calculating the current look-ahead parameters therefore uses the current approximated intermediate result 414 and the multiplier 416, as it was described, in order to calculate the current look-ahead parameters 418.

The device shown in FIG. 4 is further operable so that means for performing the exact three operand addition is implemented to perform an exact three operand addition in the current iteration step using the exact intermediate result 410 for the current iteration step, using the modulus N 404, the multiplicand 406 and the current look-ahead parameters which are provided by line 418 from means 417.

This condition is schematically illustrated in FIG. 4, in so far that means 400' for calculating the exact three operand addition is illustrated for the current iteration step, that means 412' for calculating the approximated operand addition for the current iteration step is illustrated and that means 417' for calculating the future look-ahead parameters is illustrated. In particular, means 412' is implemented to perform an approximated operand addition using the current intermediate result 410 and the modulus N in order to estimate the intermediate result Z for the future step as $Z_{nach,\ approx}$ 422, which is exactly calculated by means 400' and designated by 420. Using the value 422 the future look-ahead parameters are calculated at least considering the multiplier M 416. It is to be noted that it is of course preferred for every iteration not to provide a separate means for calculating the exact operand addition, a separate means for calculating the approximated operation addition or a separate means for calculating the current look-ahead parameters, but that a cryptography processor comprises a single means 400 for calculating the exact three operand addition, a single means for calculating the approximated operand-addition and a single means for calculating the look-ahead parameters on the basis of an approximated intermediate result. In this case a control means is provided which causes that the three means are fed with new corresponding input parameters for each iteration step, as it may be seen from FIG. 4.

Means 417 (or 417') is implemented to comprise the functionalities of means 100, 104, 106 of FIG. 1 for the new method with a shiftable multiplicand C.

With regard to the old method means 417 or means 417' is implemented, respectively, to comprise the functionalities of means 910, 930 which may instead of an exact intermediate result of the preceding step also be fed with an approximated intermediate of the preceding step, as it may be seen in FIG. 18.

As it already becomes clear from the schematic illustration in FIG. 4. the approximation of the exact intermediate result calculated in the exact three operand addition allows the calculation of the exact three operand addition in an iteration step and in parallel to that the calculation of the look-ahead parameters for the next iteration step, so that so to speak continuously, without a break for calculating look-ahead parameters, three operand additions may be performed.

If FIG. 18 is considered it may be seen that in the old concept, in which no approximation of an exact intermediate result has been performed, every iteration loop basically consisted of two serial stages, i.e. first the calculation of the look-ahead parameters for the current iteration step (910, 930) and then the calculation of the three operand addition including the corresponding shifts (920, 940, 950).

The same way also the new concept could be performed with shifts of the multiplicand C, by the fact that in an iteration step first blocks 100, 104, 106 are effective in order to perform $s_c$ and $s_z$ for the current iteration step in order to then, when the look-ahead parameters have been calculated, perform corresponding shifts using means 108 and a three operand addition using means 112.

This two stage method which brought substantial power losses is overcome by the acceleration concept shown in FIG. 4, by the fact than an exact intermediate result for the current iteration step is calculated and already in the current iteration step using an approximated intermediate result the look-ahead parameters for the next iteration steps are calculated in parallel.

By the acceleration concept shown in FIG. 4, therefore a problem of the old ZDN method of FIG. 18 and the new iteration method is overcome with a shiftable multiplicand of C of FIG. 1, which was that the shift and sign parameters $s_z$, $s_m$, a and b of FIG. 18 or $s_c$ and $s_z$ and $v_c$ and $v_n$, respectively, of the new method of FIG. 1 had to be calculated first, i.e. before a respective three operand addition. During the calculation of the shift and sign parameter the adding unit 950 in the old method of FIG. 18 or the adding unit 112 in the new method of FIG. 1 would therefore have been ideal.

In the acceleration concept of FIG. 4 this is achieved by the fact that a good and very fast estimation of the currently running three operand addition is performed. With this approximated prematurely present value in the remaining time the look-ahead parameters for the next iteration step may be calculated. These are provided when the next three operand addition begins. Thereby an acceleration of the method by a factor of up to 2 is achieved.

According to the invention it occurred that the future shift and sign values basically only depend on the top e.g. 12 bits of Z, wherein in the new concept shown in FIG. 1 the multiplicand shift value $s_c$ depends on the multiplier M, i.e. $s_m$, and on $s_z$.

Further, the approximation is based on the fact that the top bits of Z basically are not dependent on C. The reason for this is that, as it was already explained, the reduction of the multiplication always somewhat lags behind. When the numbers Z, N and C are regarded, this causes that Z is always great compared to C when the reduction lags behind. It is therefore preferred to ignore C for the approximated three operand addition in block 412 so that indeed a two-operand addition becomes of the approximated three operand addition which is further performed regarding the preceding implementations for the importance of the top bits only with a number of top bits which is smaller than the overall number of bits, like e.g. with the top 12 bits of Z and N, wherein C is neglected.

For a further acceleration of the approximated three operand addition or generally of the approximated operation addition in block 412 not only the original modulus is used as modulus N 404, but a transformed modulus, which was transformed according to the principle of modulus transformation described in DE 10111987 A1 such that a certain number of top bits which varies between 1 and a random value depending on the modulus transformation is always the same independent of an actually processed modulus. As in the preferred approximated operation addition anyway only a certain number of bits is taken based on the MSB of the modulus register and a certain number of corresponding bits from the intermediate result register Z is taken, for the approximated three operand addition nothing needs to be taken from the modulus register as the top bits in the modulus register are known anyway. The only variable magnitude for calculating the approximated operand addition therefore is the sign $v_n$ of the modulus and the e.g. top 12 bits of the intermediate result register Z. Thus, the approximated operand addition may preferably be performed in a fixed-wired combinatorial way such that it is much faster than the exact three operand addition, so that during the performance of the exact three operand addition enough time remains to calculate the look-ahead parameters for the next step on the basis of an approximated intermediate result $Z_{approx}$.

Before detailed reference is made to a special implementation of means 412 for performing the approximated operand addition, in the following the functioning of the modulus transformation is referred to with reference to FIG. 5 to 10, as it is disclosed in DE 10111987 A1.

Figure 5:
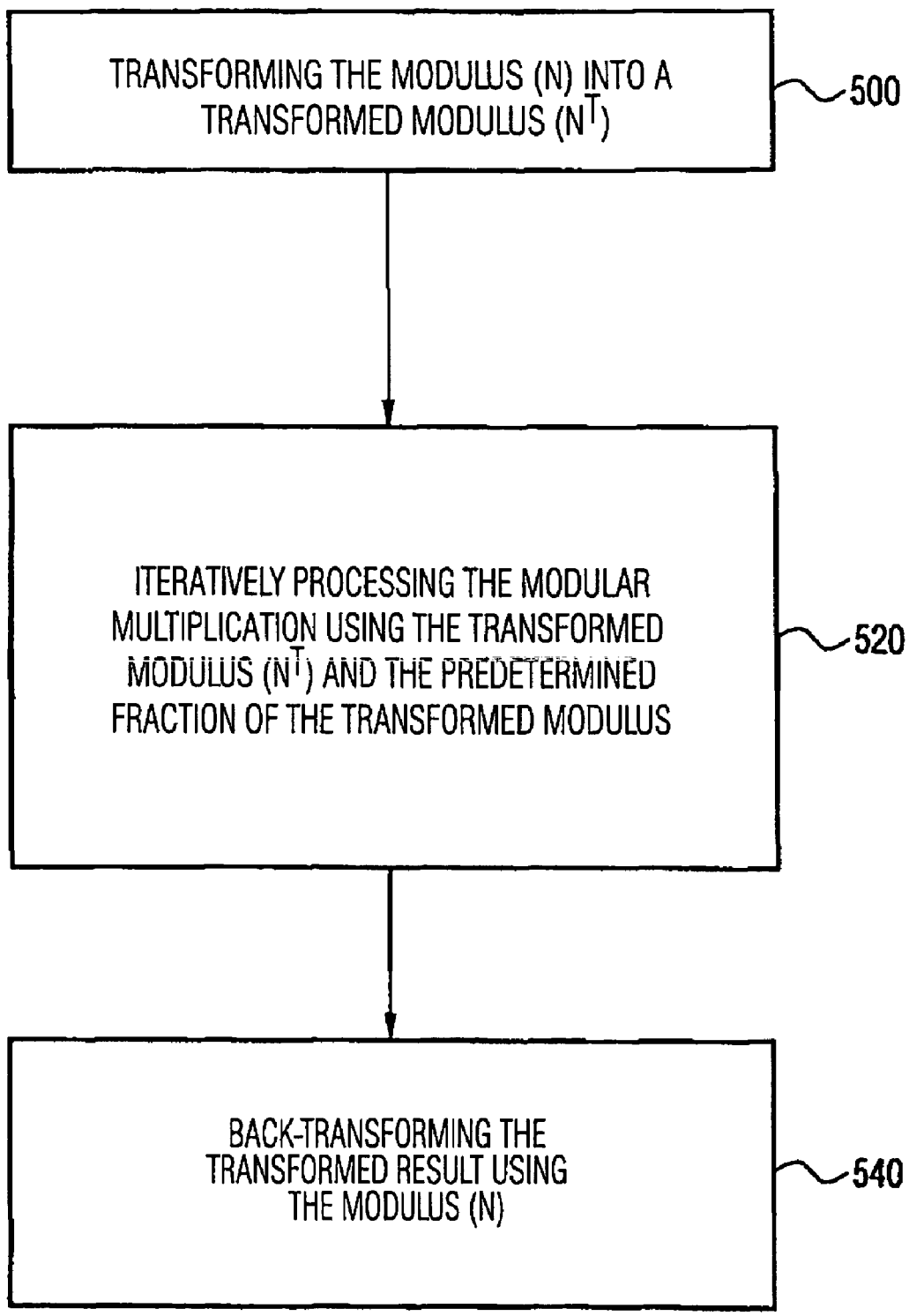
FIG. 5 shows a flow chart of the modulus transformation concept.

FIG. 5 shows a flowchart of a method for a modular multiplication of a multiplicand C with a multiplier N using a modulus N. First of all in a step 500 the modulus N is transformed into a transformed modulus $N^T$ according to the following equation:

$$N^T = T \times N.$$

In a step 520 the modular multiplication is then processed using the transformed modulus $N^T$ and the predetermined fraction of the transformed modulus which is ⅔ in the preferred embodiment. With reference to the modular exponentiation this means that an RSA equation of the following form is calculated:

$$C^T := M^d \bmod N^T.$$

The result of the modular exponentiation C is therefore not calculated in the residual class defined by the modulus N but in the residual class defined by the transformed modulus $N^T$, which is why $C^T$ is on the left side of the above equation, and not C. By using the transformed modulus $N^T$ hereby the calculation of the auxiliary reduction shift value $s_i$ is strongly simplified, which corresponds to the iteration loop of FIG. 19 of the known reduction look-ahead method.

In a final step 540 again a back transformation of $N^T$ to N is performed by performing an operation which corresponds to the following equation:

$$C := C^T \bmod N.$$

The transformed result $C^T$ which lies in the residual class of the transformed modulus $N^T$ is thereby preferably fed back through a simple shift/subtraction reduction into the residual class of the modulus N, so that C is the result of the modular exponentiation.

The transformation of the modulus N into a transformed modulus $N_T$ using the transformer T of step 500 is performed so that the predetermined fraction of the transformed modulus, i.e. the ⅔-fold of the transformed modulus in the preferred embodiment, has a more significant digit with a first predetermined value which is followed by at least one less significant digit which has a second predetermined value. Therefore the comparison of the intermediate result Z with the ⅔-fold of the transformed modulus may be strongly simplified, i.e. by searching for the top digit of Z which also has the first predetermined value, and because the difference between the more significant digit with the first predetermined value of the predetermined fraction of the transformed module and the top digit of the intermediate result Z with the first predetermined value is equal to the difference $s_i$.

In conclusion this is illustrated as follows. N is preferably transformed into a transformed modulus $N^T$ in the 32 bit CPU and not in the crypto-coprocessor, so that the following holds true:

$$N^T := T \times N,$$

wherein T is a natural number.

For $N^T$ the following results when any used numbers are binary numbers:

$$N^T = 1100 \ldots 0 \, XX \ldots XX$$

For the ⅔-fold of the transformed modulus the following value results:

$$\tfrac{2}{3} N^T = 100 \ldots 0 \, X'X' \ldots X'X'$$

From $N^T$ and ⅔ $N^T$ it may be seen that both have a first portion of for example 16 bits and then a portion of L(N) bits X or X', respectively. For the so-called ZDN comparison only the top 16 bits of the ⅔-fold of the transform modulus $N^T$ are used, because already then an error probability of better than about $2^{-10}$ results. Therefore, not all of the 512, 1024 or 2048 bits of the ⅔-fold of the transformed modulus have to be used for the ZDN comparison, but it is sufficient if this comparison is performed with the top 16 bits of the transformed modulus.

Of course even less bits of ⅔ $N^T$ might be used for the comparison, then the error probability continually increases, however. As the errors are uncritical, however, and only lead to a sub-optimal performance of the reduction look-ahead method, this way may easily be followed.

The ⅔-fold of the transformed modulus $N^T$ has therefore a more significant digit with the value 1 which is followed by at least one less significant digit which has a value of 0, i.e. a second predetermined value. In the above-described embodiment the number of the less significant digits is 15. Of course, also here greater or smaller numbers may be taken depending on the fact which differences between the intermediate result Z and the ⅔-fold of the transformed modulus $N^T$ are to be expected or to be processed, respectively. For the magnitude of the intermediate result Z of the modular multiplication, i.e. the result of the three operand addition in block 950 of FIG. 18, the following form results:

$$|Z| = 00 \ldots 01 YY \ldots Y$$

The auxiliary shift value $s_i$ is calculated according to the following equation:

$$\tfrac{2}{3} N^T \times 2^{-s_i} < |Z| \leq \tfrac{4}{3} N^T \times 2^{-s_i}.$$

Due to the topology of the ⅔-fold of the transformed modulus $N^T$ the value $s_i$ is always the distance between the most significant bit with a 1 of the ⅔-fold of the transformed modulus $N^T$ and the most significant 1 of the magnitude of the intermediate result.

This digit difference or the value $s_i$, respectively, may be determined trivially. No more iteration is required.

Apart from that, no ZDN register is required any more to save the ⅔-fold of the modulus, as per definition at least the top e.g. 16 bits of the ⅔-fold of the transformed modulus $N^T$ always has the same form. No bit comparator is required any more. The significance difference of the most significant digit of the ⅔-fold of the transformed modulus $N^T$ with a "1" and the most significant digit of Z with a "1" may easily for example be performed by a bit-wise XOR link of the register for the transformed modulus and the register for the intermediate result Z. $s_i$ is then equal to the difference of the significance of the digit where the XOR link outputs a first "1" and where the XOR link outputs a second "1".

Due to the fact that no ZDN register and no ZDN comparator is required, the whole calculating unit is to be accommodated on a smaller chip area.

Figure 19:
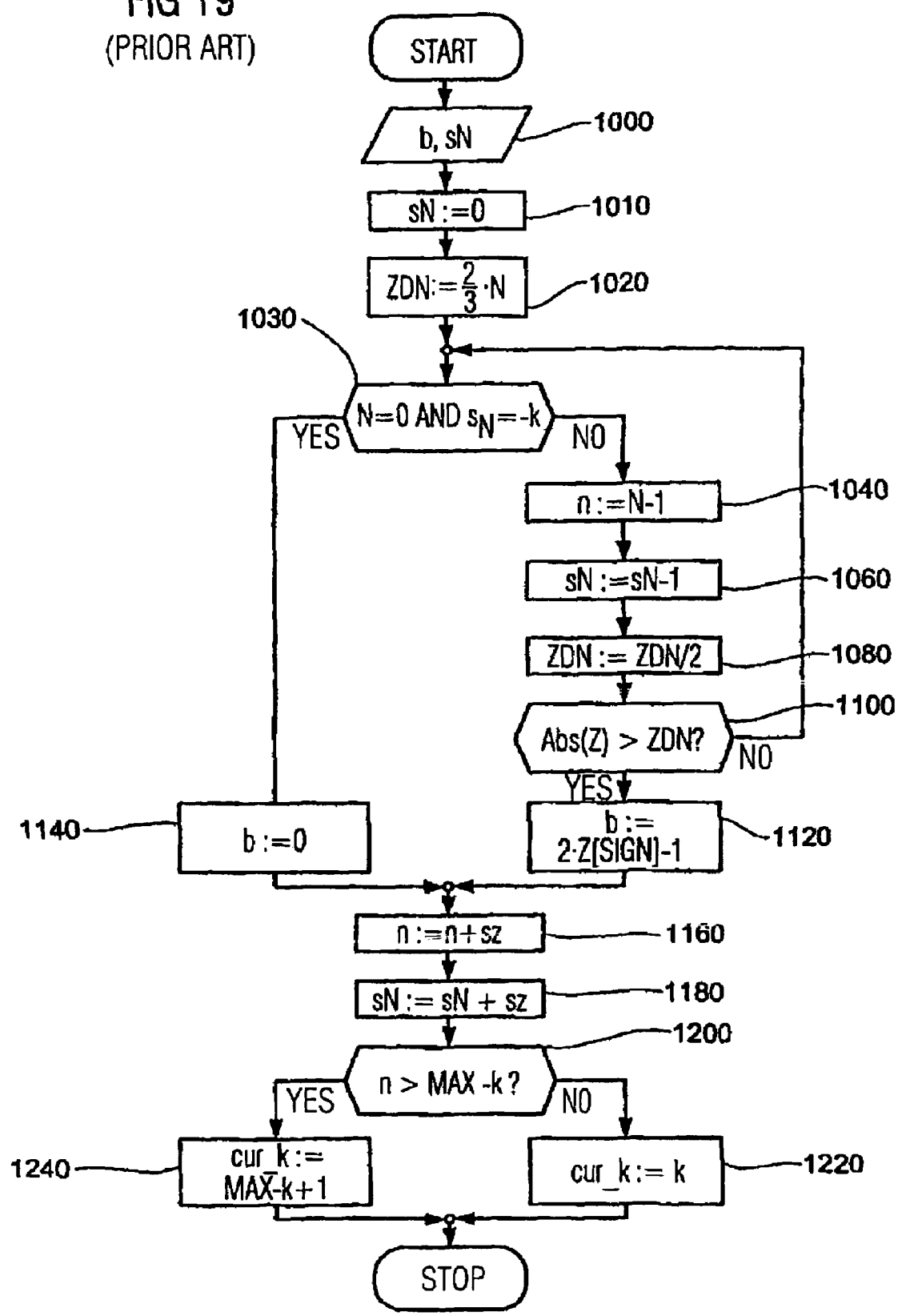
FIG. 19 shows a flow diagram illustration of the known reduction look-ahead method.

Additionally, the crypto control part, i.e. the control logic for the ZDN comparison (760 in FIG. 10), has a smaller complexity as the more compact iteration loop of FIG. 19 must not be implemented. Finally the calculation is accelerated so that by the calculation of the auxiliary shift value $s_i$ no timing problems for the overall algorithm result any more.

In the following, with reference to FIG. 6 to 9 the preferred transformation is explained in more detail.

As it was already explained, a main part of the ZDN algorithm is to fulfill the following equation:

$$\tfrac{2}{3} 2^{-s_i} N < |Z| \leq \tfrac{4}{3} 2^{-s_i} N.$$

$s_i$ is referred to as an auxiliary shift value and is the shift value which is necessary to shift Z to the same position as N with regard to the digit. In the prior art for the calculation of $s_i$ calculation operations of |Z| with ⅔ N were necessary.

The comparison to ⅔ is simplified by transforming the modulus into the transformed modulus $N^T$, wherein the transformed modulus $N^T$ is greater than N, before any modular operation with N is performed. Then all calculations modulus $N^T$ are performed. As the result of the calculation needs to be in the residual class N, however, a final reduction using N is performed.

As it is shown in FIG. 6 N is assumed to be an integer number with a length of N bits. As the modulus N is always a positive integer number, i.e. MSB=0 in the double complement illustration, the sign bit is equal to zero and the second most significant bit (MSB-1) of the modulus N is always equal to 1. For the ZDN comparison it is not necessary to compare all bits of the modulus to all bits of the intermediate result, but it is sufficient to use a number of m bits for the ZDN comparison. The most significant m bits of the modulus N define a first part of the modulus $N_T$, while the residual N-m bits of the modulus define a second part $N_R$ of the modulus. In a preferred embodiment m is equal to 16. Of course also greater or smaller values of m are possible.

As it is shown in FIG. 7, the transformation is performed such that the transformed modulus $N^T$ is 16 bits longer than the original modulus of FIG. 6.

For the ZDN comparison it is sufficient to use the first 16 bits of $N^T$, wherein for example only 12 bits are used for the comparison while the least significant 4 bits illustrate a buffer for possible carries which may come from still less significant bits.

In this case the probability that the comparison results in a wrong result is smaller than $2^{-12}$. If the comparison provides a wrong result only a sub-optimal reduction shift value $S_N$ is generated, the results modulus N is still correct, however.

When the modulus is used in the double complement illustration like in FIG. 1, then the modulus N may be broken up as follows:

$$N = 2^{n-m} N_T + N_R.$$

Now N is transformed to $N^T$ using the transformer T, wherein T is a suitably selected integer which needs to be the case for congruence reasons. $N^T$ should have the form shown in FIG. 7, i.e. the most significant bit (MSB) of $N^T$ must be equal to 0, as $N^T$ should be a positive integer. As it is implemented in the following, the second most significant and the third most significant bit of the transformed modulus have to be equal to 1 while any other bits of the top section of the transformed modulus $N^T$, which is designated by the reference numeral 33 in FIG. 1, should have a value of "0". Only in this case it results for the ⅔-fold of $N^T$ that the top section of the ⅔-fold of $N^T$, as it is shown in FIG. 8, only comprises one bit with a "1", while all other bits in this top section 44 are equal to "0", so that the already described trivial comparison may be performed for determining $s_i$.

First of all, however, with reference to FIG. 7, reference is made to the calculation of the transformed modulus $N^T$ using the transformer T. The following definition holds true:

$$N^T = TN$$
$$= T(2^{n-m}N_T + N_R)$$

For the transformer T the following holds true:

$$T = \left|\frac{2^{p-2} + 2^{p-3}}{N_T}\right|$$

Using equation 17 for the transformed modulus $N^T$ the following results:

$$N^T = \left|\frac{2^{p-2} + 2^{p-3}}{N_T}\right|(2^{n-m}N_T + N_R)$$
$$N^T = (2^{n+p-m-2} + 2^{n+p-m-3})\frac{N_T}{N_T} + (2^{p-2} + 2^{p-3})\frac{N_R}{N_T}.$$

If, for example, typical values for p and m are used, i.e. p equals 32 bits and m equals 16 bits, then for $N^T$ the following results:

$$N^T = 2^{n+14} + 2^{n+13} + N_R\frac{2^{p-2} + 2^{p-3}}{N_T}.$$

It is to be noted that the calculation of $N^T$ is preferably performed in the host CPU and not in the crypto-coprocessor. The host CPU includes a short number calculating unit which is sufficient for the calculation of $N^T$, however. As T needs to be an integer and the calculations within the crypto-coprocessor modulus $N^T$ instead of modulus N are performed, wherein $N^T$ is greater than N, only the first p–m equals 16 bits of $N^T$ are relevant for the trivial ZDN comparison in order to calculate the auxiliary shift value $s_i$. The other n bits of $N^T$ may be any number, they are not relevant for the calculation of the auxiliary shift value $s_i$, i.e. for the comparison to Z. Of course, however, all bits of the transformed modulus $N^T$ are required for the three operand addition, which is now performed using the shifted transformed modulus instead of using the shifted modulus.

For the selected values for m and p the transformer T is a 16 bit integer. Therefore, the division required for the calculation of T or required for the calculation of $N^T$, respectively, only has to be performed for the most significant 32 bits and may therefore be programmed quickly and easily on the host CPU.

In FIG. 8 the ⅔-fold of the transformed modulus $N^T$ is shown. As the MSB-1 and the MSB-2 of $N^T$ are equal to "1", as it is shown in FIG. 7, the following holds true:

$(11)_2=(3)_{10}$ and $(⅔×3)_2=(2)_{10}=(10)_2$,

A simple bit pattern results for the ⅔-fold of the transformed modulus $N^T$, wherein the length of the ⅔-fold of the transformed modulus $N^T$ is equal to n−m+p.

Due to the special form of ⅔ $N^T$ now the comparison to |Z| becomes very easy. It is known that the most significant one of ⅔ $N^T$ is at a position n+p−m−2 at the beginning of a modular operation. In a preferred embodiment, one pointer for the register Z then starts at the MSB of Z and searches for the first "1" of Z. When the MSB of Z is equal to 1 then Z is a negative number and instead the first 0 of Z is searched for.

The difference of the bit position of the first one in the register N and in the register Z determines the auxiliary shift value $s_i$.

As the result of the modulus operation in the residual class must be N, an end reduction modulus N is performed, thus a back transformation must therefore be performed (step 540 in FIG. 5).

The transformation from N to $N^T$ has the following advantages compared to the known ZDN comparison:

Instead of the calculation of ⅔ N within the crypto-coprocessor a simple transformation from N to $N^T$ in the host CPU may be performed.

On the chip no ZDN register and no comparator logic are required which is why the chip size becomes smaller and the complexity of the coprocessor is reduced.

Finally, the transformation from N to $N^T$ may be combined with a randomization of the modulus N, as it is illustrated with reference to FIG. 9. If R is an s bit long random number, the randomized transformed modulus $N^T$ has the form shown in FIG. 9. By the randomization number N the randomized transformed modulus becomes s bit longer compared to the case in which no randomization was performed (FIG. 7), i.e. longer by a number of the digits of R.

This may be expressed in the following equation:

$$N^T = TN$$
$$= T(2^{n-m}N_T + N_R)$$

The randomized transformer T is then expressed as follows:

$$T = \left|\frac{2^{p-2} - 2^{p-3} + R}{N_T}\right|$$

Thus, the following expression results for the randomized transformed modulus:

$$N^T = \left|\frac{2^{p-2} + 2^{p-3} + R}{N_T}\right|(2^{n-m}N_T + N_R)$$
$$N^T = (2^{n+p-m-2} + 2^{n+p-m-3} + R2^{n-m})\frac{N_T}{N_T} + (2^{p-2} + 2^{p-3} + R)\frac{N_R}{N_T}.$$

If p equals 144 bits m equals 16 bits and s equals 112 bits is inserted, for the transformed modulus $N^T$ including randomization the following value results:

$$N^T = 2^{n+126} + 2^{n+125} + R2^{n-16} + N_R\frac{2^{144} + 2^{143} + R}{N_T}.$$

The bit length of $N^T$ is then:

$L(N^T) = n+p-m = n+m+s = n+16+112 = n+128$ bits.

FIG. 10 shows a calculating unit which now comprises no ZDN register but only a calculating unit 700, a C register 710, an N register 720 and a Z register 730, wherein in the N register 720 now not the modulus or the shifted modulus, respectively, is stored, but the transformed modulus or a shifted transformed modulus, respectively, or, however, a randomized transformed modulus or a shifted randomized transformed modulus.

In the following, with reference to FIG. 11 a special implementation of a circuit for calculating an approximated operand addition for an iteration step is illustrated. FIG. 11 again shows the modulus register 200 and the Z register 204. In FIG. 11 the case of the transformed modulus is shown, whose top bits according to FIG. 7 are known with 011000 . . . 000 for example up to the bit with the order MSB-12 independent of the fact which modulus a calculation is actually based on. For the calculation of the approximated three operand addition first the multiplicand C is ignored.

Additionally, only the top 12 bits of Z are read out from the Z register 204 for example using a special Z multiplexer 412a. Subsequently, these top 12 bits are shifted to the left by $s_z$ using a small shifter 412b. Therefore an approximated shifted Z value results which is symbolically indicated by an intermediate register 412c. It is to be noted that the storage of this value may only be done very shortly so that no separate register needs to be provided, but that a bus onto which the corresponding bits are transferred is sufficient. Due to the fact that the modulus is known and that only the top three bits and in particular only the second and the third bit of the modulus are a 1, as this is the transformed modulus, while the residual bits are a 0, only the top three bits of the shifted last intermediate result are required, as it is indicated by a selection 412b. These three bits are fed into a combinatorial circuit 412e in which further the sign of the modulus $v_n$ is entered while the top three bits of the modulus, i.e. "011" are firmly wired within the combinatorics 412e. The combinatorics 412e then provides the top three bits of the approximated intermediate result which is again indicated as a further intermediate result register 412f. The other nine bits of the approximated intermediate result may easily be copied down from the intermediate result register 412c, as it is illustrated by an arrow 412g.

From FIG. 11 it may be seen that in the case of using the transformed modulus only a calculation using three bits needs to be performed, wherein, however, the bits of the "addition partner" are already known except for their sign, so that it becomes clear that the calculation of the approximated intermediate result $Z_{approx}$ may be performed quickly.

It is to be noted that it turned out that with such an approximated Z[L-1, L-2] the shift and sign values for the next iteration step are almost always exactly calculated. In any other cases in which the approximation of Z was too bad or too coarse, respectively, sub-optimal shift and sign values are anyway received. These sub-optimal shift and sign values, however, do not lead to the fact that an actual calculation error occurs but only leads to the fact that for calculating a modular multiplication more cycles are required than in the optimum case. Such an increase, i.e. deterioration of the performance, is, however, much smaller than the gain by the parallel performance of an approximated operand addition to calculate an approximated intermediate result for an above-regarded iteration step, to then determine the look-ahead parameters for the next iteration step using this approximated intermediate result in parallel to the calculation of the exact intermediate result.

Means for calculating an approximated intermediate result may further be implemented with little effort on the chip face so that almost a doubling of the speed of the calculating unit can be obtained for the small price of a very small additional chip area.

In the following, reference is made to a preferred embodiment with regard to FIG. 12 to 17b, wherein the multiplicand is shifted and the modulus is fixed, wherein an acceleration of the method using a calculation of an approximated intermediate result $Z_{approx}$ is used and wherein further for a further acceleration a modulus transformation is used.

FIG. 12 to 17b so to speak illustrate a flowchart illustration of the inventive method in the form of an intuitive pseudo-code. FIG. 12 to 17b further show that the inventive concept may not only be implemented in hardware but also in software depending on the circumstances. The implementation may be performed on a digital storage medium, in particular a floppy disk or a compact disc with electronic read-out control signals which may cooperate with a programmable computer system so that the inventive method is performed. In general, the invention therefore also exists in a computer program product with a program code stored on a machine-readable carrier for performing the inventive method when the computer program product runs on a computer. In other words, the invention may therefore be realized as a computer program with a program code for performing the method when the computer program runs on a computer.

FIG. 12 shows an overview over the individually used variables and the type that the variables have. The variable Csh is defined to be 3 as it is illustrated in FIG. 3 at 108b, wherein it specifies the shifter for the multiplicand C such that a multiplicand shift value $s_c$ from −3 to +3 may be used. The variable Zsh is equal 5 and defines, as it is illustrated in block 108a of FIG. 3, the size of the shifter for the intermediate results, i.e. the size that the intermediate result shift value $s_z$ may have. The variable NoZeros defines the number of zeros that the transformed modulus $N^T$ has in the register 200, i.e. based on the MSB-12 in FIG. 11 upwards. It is defined as the sum of Csh and Zsh in FIG. 12, although for this also other quantities may be used. The variable NoTopBits refers to the overall number of top bits of the Z register 204 which are read out of the Z register 204 by the Z multiplexer 412a to calculate an approximated intermediate result $Z_{approx}$. From FIG. 12 it may be seen that the variable NoTopBits is equal to 12, i.e. NoZeros (=8)+4. In FIG. 12 further a variable MaxRegBitLength is specified which specifies the register length of the overall calculating unit. This number was arbitrarily set to 160 in FIG. 12. Alternatively, this number could naturally also be 1024, 2048 or also e.g. significantly more than 2048 and for example be 2304 in order to provide sufficient room of underflow buffer 210 (FIG. 2) for the RSA modulus and also sufficient room for the reception of the transformed modulus which is greater than the normal modulus.

The variable Debug is an output variable which is not of importance in the following.

With reference to FIG. 13 some auxiliary functions are illustrated which are required for the methods illustrated in future Figs. Thus, the function ReturnBit provides the bit at the digit i of a number X.

The function SetBit is able to set the bit at the digit i of a number X with a value specified by "value", i.e. 0 or 1.

The function BitLenght is able to calculate the length of a number in a register from an LSB to an MSB. Using the register 204 in FIG. 4 the function BitLength would provide the number of bits between the MSB 220 and the LSB 214.

FIG. 14a illustrates settings/definitions or adjustments and initializations, respectively, for the modular multiplication, as it is schematically illustrated with reference to FIG. 1. The external variables were already explained with reference to FIG. 12.

In block "state of the calculating unit" required variables are defined with respect to their type. So the variable Z indicates the intermediate results. The variable ApproxZ indicates the approximated intermediate result which is for example calculated by block 412 of FIG. 4 and is indicated by 414 in FIG. 4. The variable Lsb so to say provides the comma of the multiplicand. At the beginning of a calculation the variable Lsb indicates the length of the underflow buffer 210 in bits and is for example 9 in the example illustrated in FIG. 2. In the intermediate state illustrated in FIG. 2 in which the Lsb 212 of the multiplicand has already been shifted into the underflow buffer 210 the variable Lsb would for example be 4 in order to indicate that 4 bits are still in the underflow buffer for a further downward shift of the multiplicand.

The variable cur_lsb changes with every shift of the multiplicand C and limits the shift value $s_c$ as it will be illustrated below. The variable LAccu defines the length of the multiplier in bits. The variable C indicates by how much the multiplicand C has already been shifted downwards. The sum of c and cur-Lsb is therefore constant and always corresponds to the length of the underflow buffer 210 which may be up to 300 bits and preferably between 30 and 50 bits. It is to be noted that this value may vary as it finally depends on the height of the involved numbers.

In block "determination quantities for the three operand addition" the look-ahead parameters are defined which are used in a preferred embodiment of the present invention. Thus, the variable VZ_C is the sign $v_c$ in block 112 of FIG. 1. The variable VZ_N is the sign of the modulus $v_n$ in block 112 of FIG. 1. The variable s_Z is the intermediate result shift value in block 112 of FIG. 1. Finally, the variable s_C is the multiplicand shift value as it is illustrated in block 112 of FIG. 1 and calculated in block 106 of FIG. 1.

The variables in the section "determination quantities for the multiplication" refer to the multiplication look-ahead algorithm. Thus, m is the number of the bit just regarded by the multiplier, wherein, as it is known, multiplier bits are processed from top to bottom. As long as m is greater than 0 there are still multiplier bits present. The greatest value m can take is LAccu, that is before a starting iterative multiplication where no digit of the multiplier has been processed.

The variable LA defines a used look-ahead rule, wherein the look-ahead rules may be used as they are described in DE 3631992 C2 (corresponds to the U.S. Pat. No. 4,870,681). The variable s_M is the multiplication shift value $s_m$, as it is calculated by block 100 of FIG. 1.

Fist of all, the individual variables are adjusted and initialized using the given quantities. In particular, reference is made to the variable Lsb which is set using the bit length of the modulus N (or transformed modulus $N^T$) to be processed. From this it may be seen that the underflow buffer is newly initialized depending on a used modulus for every e.g. RSA calculation, i.e. for a modular exponentiation with a modulus. It is further noted that the modulus is oriented left-justified in the register which means that for smaller moduli also the greater underflow buffer is available and vice versa.

FIG. 14b shows the method in pseudocode, which was illustrated according to FIGS. 1 and 4 in block diagram form. The iteration is performed until the stopping conditions are fulfilled. Stopping conditions are on the one hand that m is equal to 0, i.e. that all multiplier digits are processed, and that c is equal to 0, i.e. that the multiplicand at the end of the overall modular multiplication is again aligned with the LSB 208 of the modulus N (referring to FIG. 2) with regard to an LSB 212. Typically, first of all m will be equal to 0, while only then, some cycles later, c equals 0, as the reduction, as it was performed, somewhat runs after or "lags behind" the multiplication, respectively.

First of all a first function LAModulo is performed, that is using an approximated intermediate result. The function LAModulo which is explained below thus provides the functionality of means 417 in which look-ahead parameters for the next iteration step are calculated using an approximated intermediate result $Z_{approx}$.

Hereupon, a function postprocessing_LAModulo, a function LAMultiplication and a function postprocessing_LAMultiplicaton takes place to generally calculate the multiplication shift value $s_z$ and the multiplication look-ahead parameter $v_n$. Corresponding reduction look-ahead parameters $s_z$ and $v_n$ are calculated in the preceding function LAModulo. The functions LAModulo, postprocessing_LAModulo, LAMultiplication and postprocessing_LAMultiplication all take place in means 417, in which not the look-ahead parameters for the current three operand addition are calculated, but in which the look-ahead parameters already for the next iteration step are calculated.

Hereupon the multiplicand C is shifted by the corresponding multiplicand shift value which corresponds to the functionality of means 108 of FIG. 1 or, according to the definition, of means 400 of FIG. 4 for exactly calculating the three operand addition.

Then the approximated intermediate result is already set for the next iteration step in order to then perform an exact three operand addition using the function ThreeOperandAddition, i.e. an exact three operand addition for the current iteration step. Hereupon the variables m, c and cur_lbs are adjusted.

As long as the iteration stopping condition m equal to 0 or c equal to 0 are not fulfilled, the While loop is run.

In the next "if" loop when a top bit of the Z register is equal to 1 which indicates a negative number a degenerated three operand addition is performed, i.e. that to the current (negative) intermediate result a modulus N with the sign $v_n$ equal to +1 is added in order to have a positive intermediate result in the end wherein the bits below the LSB, i.e. the underflow buffer bits are cut off as it is performed by the last "div" operation.

In the following, the functions given in FIG. 14b are explained in more detail. FIG. 15 shows an overview over the function three operand addition which is performed such as it is illustrated in block 112 of FIG. 1. In particular it may be seen from FIG. 15 that during the implemented three operand addition the shift of C is performed outside the three operand addition while the shift of Z by $s_z$ is performed within the three operand addition. This has advantages in certain implementations. Alternatively, however, also the shift of C might be performed within the three operand addition or both shifts might be performed outside the three operand addition.

It is noted, that the modular reduction using the modulus 2**MaxRegBitLength only serves to simulate in software that a most significant bit of the Z register in the case in which $s_z$ was selected so that the MSB 220 comes equal with the MSB 206 in FIG. 2 may fall out to the top in an addition and in a carry rippling which, however, as it is known in the art, is not critical when special carry handling routines are used.

The shift function in FIG. 15 is self-explanatory and shows in software how a register content X is either shifted to the left or shifted to the right by a shift value s_X. A shift to the left in a binary illustration means a multiplication with $2^{sx}$. A shift to the right means a division by $2^{sx}$.

The function LAModulo which is illustrated in FIG. 16a is operable to calculate the reduction parameters which on the one hand include the intermediate result shift value $s^z$ and on the other hand the sign of the modulus VZ_N. As input quantities, Z, N and c are preferred. First, the variable cur_Zsh is set to the minimum of the variable Zsh, i.e. the shifter length of the intermediate result shifter and c, i.e. the current deviation of the LSB of the multiplicand from the starting LSB 208 in FIG. 2. Hereupon, the approximated three operand addition is performed which in principle is performed just like the exact three operand addition, with the difference, however, that only the top 12 bits or the NoTopBits of N are taken, respectively, and that in the three operand addition formulation $s_c$ and the sign of C, i.e. $v_c$ are set to 0.

The following %1 searcher first of all provides the most significant bit of the register Z and then increments the shift value $s_z$ until $s_z$ is smaller than the variable cur_Zsh and simultaneously does not exceed the maximum register length.

The last case in the if loop refers to the case which is not shown in FIG. 2, in which $s_z$ might therefore be selected greater than it is allowed by the shifter Zsh, in which therefore the MSB in the Z register 4 is away by more bits than by Zsh from the MSB 206 of the modulus within the modulus register 200. In this case $s_z$ is set to Zsh via cur-Zsh. As here the intermediate result Z is definitely smaller than the modulus N by one or several bits, a reduction in the form of a modulus subtraction of the three operand addition is suppressed which may be seen by the fact that the reduction look-ahead parameter $v_n$ is set to 0. Thus, a reduction is prevented. If, however, a reduction would be performed, then the intermediate result would be negative and in particular greater in its amount than it was before. Preventing the reduction in the case in which the intermediate result Z may not completely be shifted to the top due to a limited shifter length substantially increases the efficiency of the inventive method.

In FIG. 16b the function postprocessing_LAModulo is illustrated. If m is greater than 0, i.e. if there are still multiplier digits to be processed, and if sZ is greater than 0, while c is smaller than the number of zeros with regard to the transformed modulus, no shift is performed, but $s_z$ is set to 0. Simultaneously also a reduction is prevented, i.e. the sign $v_n$ is set to 0.

FIG. 17a shows the function LAMultiplication which defines the multiplication look-ahead algorithm. First of all, the variables cur_Csh and $s_m$ are initialized, as it is illustrated in FIG. 17a. Then a %1 searcher is performed during which the variable $s_m$ is incremented. If the stopping condition without special situation is fulfilled the While loop already results in the multiplication shift value $s_m$, which is calculated in block 100 of FIG. 1.

Hereupon, depending on the look-ahead parameter LA which is compared to bits of the multiplier, a corresponding special handling is performed in order to e.g. set the sign $v_c$ of the multiplicand to 0, if for example a greater multiplication shift value is possible than actually allowed by the shifter. In this case only an upward shift, modular reduction is performed, but no multiplicand is added.

FIG. 17b shows the function postprocessing_LAMultiplication in which the functionality of means 106 is performed, in which i.e. $s_c$ is calculated from $s_z-s_m$.

If a value $s_c$ is obtained which is greater than the allowed length $C_{sh}$ of the C shifter, then $s_c$ is equal to the maximum shifter length, $s_z$ is set such as it is shown in FIG. 17b and the sign of the modulus $v_n$ in the three operand addition in block 112 of FIG. 1 is set to 0 so that no reduction takes place because not the maximum shift value has been taken but a shift value $s_z$ which has been set in the function post processing, which is shown in FIG. 17b. While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A hardware device for calculating a multiplication of a multiplier and a multiplicand with regard to a modulus using an iteration method comprising several iteration steps, comprising a preceding iteration step, a current iteration step and an iteration step following the current iteration step, comprising:

a hardware calculating unit;

a first hardware register configured to store the modulus, the first hardware register being coupled to the hardware calculating unit;

a second hardware register configured to store the multiplicand, the second hardware register being coupled to the hardware calculating unit;

a third hardware register configured to store an intermediate result, the third hardware register being coupled to the hardware calculating unit;

wherein the hardware calculating unit is configured to:

1) perform an exact three operand addition in the preceding iteration step using a preceding intermediate result, the modulus and the multiplicand and using preceding look-ahead parameters to obtain an exact intermediate result for the current iteration step;

2) perform an approximated operand addition in the preceding iteration step using the preceding intermediate result and the modulus and at least one look-ahead parameter of the preceding look-ahead parameters in order to obtain an approximated intermediate result for the current iteration step; and 3) calculate current look-ahead parameters in the preceding iteration step using the approximated intermediate result and the multiplier, 4) perform an exact three operand addition in the current iteration step using the exact intermediate result for the current iteration step, the modulus, the multiplicand and the current look-ahead parameters calculated by the calculator, 5) perform an approximated operand addition in the current iteration step using the current intermediate result and the modulus and at least one look-ahead parameter of the current look-ahead parameters to obtain an approximated intermediate result for the iteration step following the current iteration step; and 6) obtain look-ahead parameters in the current iteration step for the iteration step following the current iteration step using the approximated intermediate result for the iteration step following the current iteration step and the multiplier, wherein the first and second steps are performed in parallel, and the fourth and fifth steps are performed in parallel, wherein the multiplication of the multiplier and the multiplicand with regard to the modulus is calculated within a cryptographic calculation, and wherein the multiplier, the multiplicand and the modulus are parameters of the cryptographic calculation.

2. The device according to claim 1,
wherein the first and fourth steps require a first time period for the calculation, and
wherein the second, third, fifth, and sixth steps commonly require a second time period for the calculation which is shorter or equal to the first time period.

3. The device according to claim 1,
wherein the second and fifth steps are performed without consideration of the multiplicand.

4. The device according claim 1,
wherein the second and fifth steps use only a number of more significant bits of the preceding intermediate result and the modulus which is smaller than an overall number of bits of the preceding intermediate result and the preceding modulus.

5. The device according to claim 4,
wherein the modulus is a transformed modulus which is derived using a transformation specification from a modulus which is provided by a cryptographic calculation, wherein the transformation specification is implemented so that a number of more significant bits of the modulus is already known.

6. The device according to claim 5,
wherein the transformation specification is implemented so that the number of more significant bits of the modulus comprises a certain number of most significant bits in one state and remaining bits in an opposite state.

7. The device according to claim 6, wherein the second and fifth steps are performed to compose the approximated intermediate result of bits of the preceding intermediate result shifted by a shifting parameter, whose significance does not correspond to the number of most significant bits of the transformed modulus, and a combination of the number of bits of the transformed modulus and under consideration of a sign parameter $v_n$ and bits of a corresponding significance of the shifted intermediate result.

8. The device according to claim 1,
wherein the third and sixth steps are performed to calculate an intermediate result shift value and a multiplicand shift value, wherein the modulus is not shifted.

9. The device according to claim 8,
wherein the third and sixth steps are performed to calculate a multiplicand sign and a modulus sign as further look-ahead parameters.

10. A method for calculating a multiplication of a multiplier and of a multiplicand with regard to a modulus using an iteration method having several iteration steps, performed by a hardware circuit comprising a calculating unit and registers, the iteration method comprising a preceding iteration step, a current iteration step and an iteration step following the current iteration step within a cryptographic calculation, wherein the multiplier, the multiplicand and the modulus are parameters of the cryptographic calculation, the method comprising:

in the preceding iteration step
performing, by a hardware calculating unit, an exact three operand addition using a preceding intermediate result, the modulus and the multiplicand and using preceding look-ahead parameters in order to obtain an exact intermediate result of the cryptographic calculation for the current iteration step;
performing, by the hardware calculating unit, an approximated operand addition using the preceding intermediate result and the modulus and at least one look-ahead parameter of the preceding look-ahead parameters in order to obtain an approximated intermediate result of the cryptographic calculation for the current iteration step; and
calculating, by the hardware calculating unit, current look-ahead parameters using the approximated intermediate result of the cryptographic calculation and the multiplier, in the current iteration step:
performing, by the hardware calculating unit, an exact three operand addition using the exact intermediate result of the cryptographic calculation for the current iteration step, the modulus, the multiplicand and the current look-ahead parameters;
performing, by the hardware calculating unit, an approximated operand addition using the current intermediate result and the modulus and at least one look-ahead parameter of the current look-ahead parameters to obtain an approximated intermediate result of the cryptographic calculation for the iteration step following the current iteration step; and
calculating, by the hardware calculating unit, look-ahead parameters for the iteration step following the current iteration step using the approximated intermediate result of the cryptographic calculation for the iteration step following the current iteration step and the multiplier, wherein the multiplication of the multiplier and the multiplicand with regard to the modulus is calculated within a cryptographic calculation, and wherein the multiplier, the multiplicand and the modulus are parameters of the cryptographic calculation.

11. A digital storage medium having stored thereon a computer program comprising a program code for performing the method for calculating a multiplication of a multiplier and of a multiplicand with regard to a modulus using an iteration method having several iteration steps comprising a preceding iteration step, a current iteration step and an iteration step following the current iteration step within a cryptographic calculation, wherein the multiplier, the multiplicand and the modulus are parameters of the cryptographic calculation, comprising:

in the preceding iteration step
performing an exact three operand addition using a preceding intermediate result, the modulus and the multiplicand and using preceding look-ahead parameters in order to obtain an exact intermediate result of the cryptographic calculation for the current iteration step;
performing an approximated operand addition using the preceding intermediate result and the modulus and at least one look-ahead parameter of the preceding look-ahead parameters in order to obtain an approximated intermediate result of the cryptographic calculation for the current iteration step; and
calculating current look-ahead parameters using the approximated intermediate result of the cryptographic calculation and the multiplier, in the current iteration step:
performing an exact three operand addition using the exact intermediate result of the cryptographic calculation for the current iteration step, the modulus, the multiplicand and the current look-ahead parameters;
performing an approximated operand addition using the current intermediate result and the modulus and at least one look-ahead parameter of the current look-ahead parameters to obtain an approximated intermediate result of the cryptographic calculation for the iteration step following the current iteration step; and calculating look-ahead parameters for the iteration step following the current iteration step using the approximated intermediate result of the cryptographic calculation for the iteration step following the current iteration step and the multiplier, when the program is running on a computer, wherein the multiplication of the multiplier and the multiplicand with regard to the modulus is calculated within a cryptographic calculation, and wherein the multiplier, the multiplicand and the modulus are parameters of the cryptographic calculation.

12. A system for calculating a multiplication of a multiplier and a multiplicand with regard to a modulus using an iteration method comprising several iteration steps, comprising a preceding iteration step, a current iteration step and an iteration step following the current iteration step, the system comprising:

a processor;

a memory communicatively coupled to the processor; and software executing in the processor configured to:

a) in the preceding iteration step, perform an exact three operand addition using a preceding intermediate result, the modulus and the multiplicand and using preceding look-ahead parameters in order to obtain an exact intermediate result of the cryptographic calculation for the current iteration step;

b) in the preceding iteration step, perform an approximated operand addition using the preceding intermediate result and the modulus and at least one look-ahead parameter of the preceding look-ahead parameters in order to obtain an approximated intermediate result of the cryptographic calculation for the current iteration step; and c) calculate current look-ahead parameters using the approximated intermediate result of the cryptographic calculation and the multiplier, d) in the current iteration step, perform an exact three operand addition using the exact intermediate result of the cryptographic calculation for the current iteration step, the modulus, the multiplicand and the current look-ahead parameters;

e) in the current iteration step, perform an approximated operand addition using the current intermediate result and the modulus and at least one look-ahead parameter of the current look-ahead parameters to obtain an approximated intermediate result of the cryptographic calculation for the iteration step following the current iteration step; and f) calculate look-ahead parameters for the iteration step following the current iteration step using the approximated intermediate result of the cryptographic calculation for the iteration step following the current iteration step and the multiplier, wherein the multiplication of the multiplier and the multiplicand with regard to the modulus is calculated within a cryptographic calculation, and wherein the multiplier, the multiplicand and the modulus are parameters of the cryptographic calculation.

13. A hardware device for calculating a multiplication of a multiplier and a multiplicand with regard to a modulus using an iteration method comprising several iteration steps, comprising a preceding iteration step, a current iteration step and an iteration step following the current iteration step, comprising:

a hardware calculating unit;

a first hardware register for storing the modulus, the first hardware register being coupled to the hardware calculating unit;

a second hardware register for storing the multiplicand, the second hardware register being coupled to the hardware calculating unit;

a third hardware register for storing an intermediate result, the third hardware register being coupled to the hardware calculating unit;

wherein the hardware calculating unit configured to perform the following steps:

1) perform an exact three operand addition in the preceding iteration step using a preceding intermediate result, the modulus and the multiplicand and using preceding look-ahead parameters to obtain an exact intermediate result for the current iteration step;

2) perform an approximated operand addition in the preceding iteration step using the preceding intermediate result and the modulus and at least one look-ahead parameter of the preceding look-ahead parameters in order to obtain an approximated intermediate result for the current iteration step; and 3) calculate current look-ahead parameters in the preceding iteration step using the approximated intermediate result and the multiplier, 4) perform an exact three operand addition in the current iteration step using the exact intermediate result for the current iteration step, the modulus, the multiplicand and the current look-ahead parameters calculated by the calculator, 5) perform an approximated operand addition in the current iteration step using the current intermediate result and the modulus and at least one look-ahead parameter of the current look-ahead parameters to obtain an approximated intermediate result for the iteration step following the current iteration step; and 6) obtain look-ahead parameters in the current iteration step for the iteration step following the current iteration step using the approximated intermediate result for the iteration step following the current iteration step and the multiplier; and wherein the first and second steps are performed in parallel, and the fourth and fifth steps are performed in parallel, wherein the multiplication of the multiplier and the multiplicand with regard to the modulus is calculated within a cryptographic calculation, and wherein the multiplier, the multiplicand and the modulus are parameters of the cryptographic calculation.

14. The device according to claim 13, wherein the first and fourth steps require a first time period for the calculation, and wherein the second, third, fifth, and sixth steps commonly require a second time period for the calculation which is shorter or equal to the first time period.

15. The device according to claim 13, wherein the second and fifth steps are performed without consideration of the multiplicand.

16. The device according claim 13, wherein the second and fifth steps use only a number of more significant bits of the preceding intermediate result and the modulus which is smaller than an overall number of bits of the preceding intermediate result and the preceding modulus.

17. The device according to claim 16,
wherein the modulus is a transformed modulus which is derived using a transformation specification from a modulus which is given by a cryptographic calculation, wherein the transformation specification is implemented so that a number of more significant bits of the modulus is already known.

18. The device according to claim 17,
wherein the transformation specification is implemented so that the number of more significant bits of the modulus comprises a certain number of most significant bits in one state and remaining bits in an opposite state.

19. The device according to claim 18, wherein the second and fifth steps are performed to compose the approximated intermediate result of bits of the preceding intermediate result shifted by a shifting parameter, whose significance does not correspond to the number of most significant bits of the transformed modulus, and a combination of the number of bits of the transformed modulus and under consideration of a sign parameter $v_n$ and bits of a corresponding significance of the shifted intermediate result.

20. The device according to claim 13,
wherein the third and sixth steps are performed to calculate an intermediate result shift value and a multiplicand shift value, wherein the modulus is not shifted.

21. The device according to claim 20,
wherein the third and sixth steps are performed to calculate a multiplicand sign and a modulus sign as further look-ahead parameters.

* * * * *